(12) United States Patent
Naito et al.

(10) Patent No.: US 8,761,729 B2
(45) Date of Patent: Jun. 24, 2014

(54) RADIO TERMINAL APPARATUS, COMMUNICATION SYSTEM, AND METHOD OF CONTROLLING RADIO TERMINAL APPARATUS

(75) Inventors: Masahiko Naito, Tokyo (JP); Katsutoshi Itoh, Tokyo (JP)

(73) Assignee: Sony Corporation, Tokyo (JP)

( * ) Notice: Subject to any disclaimer, the term of this patent is extended or adjusted under 35 U.S.C. 154(b) by 368 days.

(21) Appl. No.: 13/240,037

(22) Filed: Sep. 22, 2011

(65) Prior Publication Data
US 2012/0115439 A1 May 10, 2012

(30) Foreign Application Priority Data
Nov. 10, 2010 (JP) ................................. 2010-251991

(51) Int. Cl.
*H04M 1/66* (2006.01)

(52) U.S. Cl.
USPC ........................................................ 455/411

(58) Field of Classification Search
USPC .......... 455/411, 422, 414, 403, 558, 418, 466
See application file for complete search history.

(56) References Cited

U.S. PATENT DOCUMENTS

| | | | |
|---|---|---|---|
| 2003/0050081 A1* | 3/2003 | Huber | 455/466 |
| 2005/0101323 A1 | 5/2005 | De Beer | |
| 2005/0209970 A1* | 9/2005 | Shiba et al. | 705/52 |
| 2007/0053334 A1* | 3/2007 | Sueyoshi et al. | 370/338 |
| 2007/0129078 A1 | 6/2007 | De Beer | |
| 2008/0020755 A1 | 1/2008 | Liu et al. | |
| 2008/0139173 A1* | 6/2008 | Yokobori et al. | 455/411 |
| 2008/0207172 A1* | 8/2008 | Eguchi et al. | 455/411 |
| 2009/0163175 A1 | 6/2009 | Shi et al. | |
| 2009/0163176 A1* | 6/2009 | Hasegawa | 455/411 |
| 2010/0024025 A1* | 1/2010 | Yoshida et al. | 726/9 |
| 2010/0069039 A1 | 3/2010 | Kawamura et al. | |
| 2010/0069059 A1* | 3/2010 | Nakagaki et al. | 455/422.1 |
| 2010/0311402 A1* | 12/2010 | Srinivasan et al. | 455/418 |
| 2010/0311468 A1* | 12/2010 | Shi et al. | 455/558 |
| 2011/0035594 A1* | 2/2011 | Fox | 713/170 |

FOREIGN PATENT DOCUMENTS

| | | |
|---|---|---|
| DE | 10 2005 005 712 A1 | 8/2006 |
| EP | 2 076 071 A1 | 7/2009 |
| JP | 2008-210301 | 9/2008 |
| WO | WO 02/067563 A1 | 8/2002 |
| WO | WO 2007/143342 A2 | 12/2007 |

OTHER PUBLICATIONS

Extended European Search Report issued Mar. 26, 2012, in European Patent Application No. 11180716.0.
U.S. Appl. No. 13/249,589, filed Sep. 30, 2011, Naito, et al.

* cited by examiner

*Primary Examiner* — Melody Mehrpour
(74) *Attorney, Agent, or Firm* — Oblon, Spivak, McClelland, Maier & Neustadt, L.L.P.

(57) ABSTRACT

A radio terminal apparatus includes a transmission control unit transmitting an acquisition request for acquiring contract authentication information via a radio channel when a predetermined operation of acquiring the contract authentication information associated with a radio service provider providing a radio connection service is received; a reception unit receiving the contract authentication information transmitted via the radio channel in response to the acquisition request; and a control unit controlling writing the received contract authentication information in a retaining unit.

10 Claims, 14 Drawing Sheets

| | SERVICE PROVIDER NAME 251 | CORRESPONDENT REGION 252 | USE FEE INFORMATION 253 | CHANNEL QUALITY INFORMATION 254 | CONGESTION DEGREE INFORMATION 255 | CONGESTION DEGREE PREDICTION INFORMATION 256 |
|---|---|---|---|---|---|---|
| 1 | FIRST RADIO SERVICE PROVIDER (defghi) | ... | 1000 YEN/250 MB | SLOW | EXCELLENT | EXCELLENT |
| 2 | SECOND RADIO SERVICE PROVIDER (JklmNopq) | ... | 500 YEN/150 MB | SLOW | GOOD | CONGESTED |
| 3 | THIRD RADIO SERVICE PROVIDER (rs) | ... | 1500 YEN/1 DAY | FAST | CONGESTED | EXCELLENT |
| 4 | FOURTH RADIO SERVICE PROVIDER (XY) | ... | 1500 YEN/1 MONTH | SLOW | EXCELLENT | GOOD |

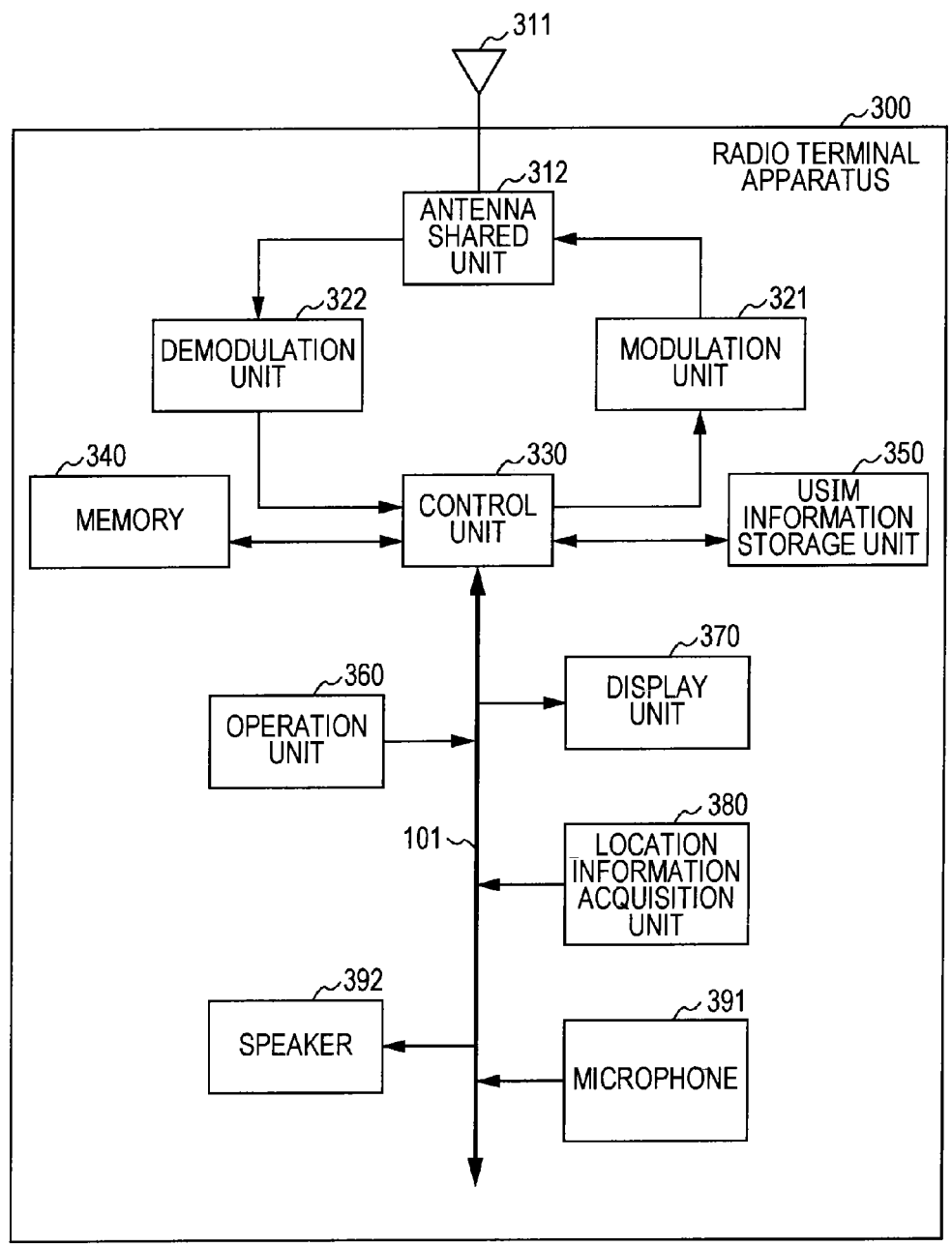

FIG. 8

S530 — PLEASE SELECT RADIO SERVICE PROVIDER DOWNLOADING USIM INFORMATION

370

| 531 | 532 RADIO SERVICE PROVIDER | 533 USE FEE | 534 CONGESTION DEGREE |
|---|---|---|---|
| ☐ | d*abc*efghi | 1000 YEN/250 MB | EXCELLENT |
| ☐ | ★JklmNopq | 500 YEN/150 MB | GOOD |
| ☑ | rs by TUVW | 1500 YEN/1 DAY | CONGESTED |
| ☐ | X Y abcdefg | 500 YEN/1 MONTH | EXCELLENT |

535 CONFIRMATION   536 RETURN

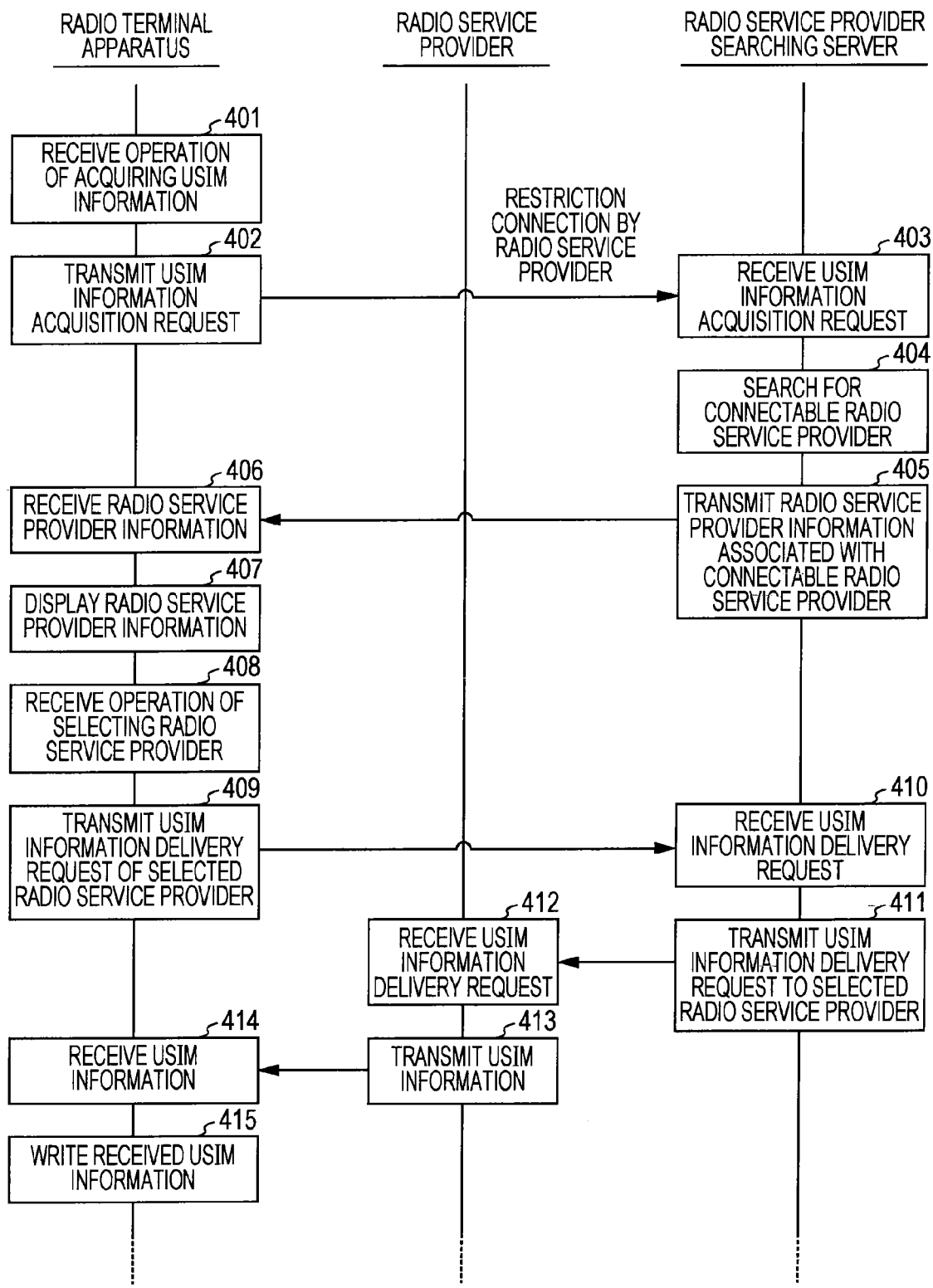

OVERSEAS TRAVEL TO
KINGDOM OF SWEDEN

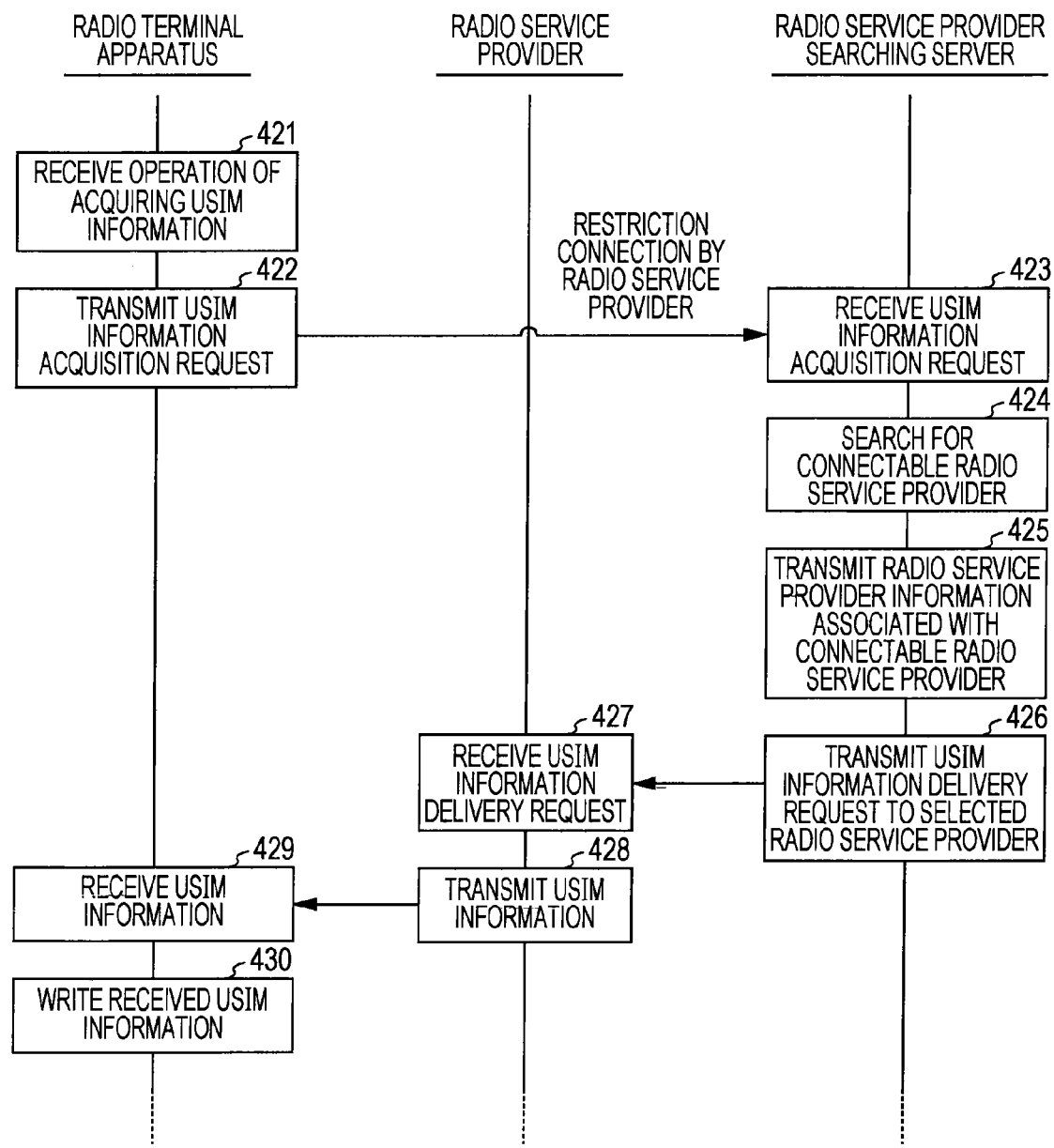

RADIO TERMINAL APPARATUS, COMMUNICATION SYSTEM, AND METHOD OF CONTROLLING RADIO TERMINAL APPARATUS

BACKGROUND

The present disclosure relates to a radio terminal apparatus, and more particularly, to a radio terminal apparatus connected to a public radio network, a communication system including the radio terminal apparatus, and a method of controlling the radio terminal apparatus.

Hitherto, radio terminal apparatuses connected to a public radio network have come into wide use. For example, as portable radio terminal apparatuses, there are known portable telephone apparatuses or radio terminal apparatuses such as terminal apparatuses for data communication only. Further, as fixed radio terminal apparatuses, there are known radio terminal apparatuses configured to collect data from automated vending machines.

In recent years, there are a large number of radio service providers in each nation or region as radio service providers providing a radio connection service to radio terminal apparatuses.

In order for the radio terminal apparatus to connect to a public radio network, it is necessary to mount a card (card (a so-called UICC card) retaining contract authentication information) issued by the radio service provider providing a radio connection service to the radio terminal apparatus. Further, there has been suggested a technique used to store different information in the card (UICC card) installed in the radio terminal apparatus.

For example, there has been suggested a communication system which appends a credit function of dealing with electronic money or a large-capacity memory card function to the UICC card as well as a USIM function of dealing with subscriber information (for example, Japanese Unexamined Patent Application Publication No. 2008-210301).

SUMMARY

In the above-mentioned technique according to the related art, the credit function or the large-capacity memory card function is appended to the UICC card as well as the USIM function. Therefore, UICC card can have various integrated services associated with the radio terminal apparatus.

In the above-mentioned technique according to the related art, however, when the radio terminal apparatus receives the radio connection service, the radio terminal apparatus may not avoid receiving only the radio connection service through the radio service provider issuing the UICC card installed in the radio terminal apparatus except for a specific case (in case of emergency or the like).

In recent years, users going overseas for tour or on business increasingly tend to use the radio terminal apparatus which the users use in Japan. However, a case can be supposed in which the radio service provider issuing the UICC card installed in the radio terminal apparatus does not provide the radio connection service in the foreign countries. In this case, for example, the user can receive the radio connection service by a roaming contract or the like of a radio service provider in the foreign country. However, in some cases, relatively high connection fees have to be paid through a roaming contract or the like.

For this reason, in order to receive the radio connection service provided by the radio service provider in a foreign country, it can be considered that the user mounts a UICC card issued by the radio service provider in the foreign country. In this case, the user has to go to the trouble of searching for the radio service provider in the foreign country. Further, since the user has to substitute the UICC with the UICC issued by the radio service provider in the foreign country after searching for the radio service provider, it is troublesome to substitute the UICC with the new UICC.

It is desirable to easily use contract authentication information appropriate to the use region of a radio terminal apparatus.

According to an embodiment of the disclosure, there are provided a radio terminal apparatus, a method of controlling the radio terminal apparatus, and a program causing a computer to execute the method. The radio terminal apparatus includes a transmission control unit transmitting an acquisition request for acquiring contract authentication information via a radio channel when a predetermined operation of acquiring the contract authentication information associated with a radio service provider providing a radio connection service is received; a reception unit receiving the contract authentication information transmitted via the radio channel in response to the acquisition request; and a control unit controlling writing the received contract authentication information in a retaining unit. Accordingly, when the predetermined operation is received, the acquisition request for acquiring the contract authentication information is transmitted via the radio channel. When the contract authentication information transmitted via the radio channel is received in response to the acquisition request, the received contract authentication information can be written in the retaining unit.

In the embodiment of the disclosure, the transmission control unit may transmit the acquisition request via the radio channel through a restricted connection process performed for only restricted connection without using the contract authentication information retained in the retaining unit. Accordingly, an operation can be achieved in such a manner that the acquisition request is transmitted via the radio channel through the restricted connection process performed for only the restricted connection without using the contract authentication information retained in the retaining unit.

In the embodiment of the disclosure, the reception unit may receive the contract authentication information via the radio channel connected through the restricted connection process in response to the acquisition request. Accordingly, an operation can be achieved in such a manner that the contract authentication information is received via the radio channel connected through the restricted connection process in response to the acquisition request.

In the embodiment of the disclosure, the acquisition request may include location information acquired by the radio terminal apparatus or location information corresponding to a location of a base station to which the radio terminal apparatus is connected. The reception unit may receive radio service provider information regarding a plurality of radio service providers selected based on the location information included in the acquisition request. The control unit may select one radio service provider among the plurality of radio service providers associated with the received radio service provider information based on radio service provider selection information set through an operation of a user and may write the contract authentication information associated with the selected radio service provider in the retaining unit. Accordingly, an operation can be achieved in such a manner that one radio service provider is selected from the plurality of radio service providers associated with the received radio service provider information based on the radio service pro- vider selection information set through the operation of the user and the contract authentication information associated with the selected radio service provider is written in the retaining unit.

In the embodiment of the disclosure, the acquisition request may include radio service provider selection information set through an operation of a user. The reception unit may receive the contract authentication information associated with the selected radio service provider based on the radio service provider selection information included in the acquisition request. Accordingly an operation can be achieved in such a manner that it is possible to receive the contract authentication information associated with the selected radio service provider based on the radio service provider selection information included in the acquisition request.

In the embodiment of the disclosure, the acquisition request may include location information acquired by the radio terminal apparatus or location information corresponding to a location of a base station to which the radio terminal apparatus is connected. The reception unit may receive radio service provider information regarding a plurality of radio service providers selected based on the location information included in the acquisition request. The control unit may display the received radio service provider information on a display unit. The transmission control unit may transmit, as the acquisition request, an acquisition request for acquiring the contract authentication information associated with the selected radio service provider, when receiving a selection operation of selecting a desired radio service provider among the plurality of radio service providers associated with the radio service provider information displayed on the display unit. Accordingly, an operation can be achieved in such a manner that the received radio service provider information is displayed and the acquisition request for acquiring the contract authentication information associated with the selected radio service provider is transmitted when the selection operation of selecting the desired radio service provider among the plurality of radio service providers associated with the radio service provider information is received.

In the embodiment of the disclosure, the control unit may display, as the radio service provider information, a list of labels of the plurality of radio service providers and display at least one of the cost associated with the radio connection service provided by the radio service provider to be displayed, radio connection quality associated with the radio connection service, a congestion degree associated with the radio connection service, and congestion degree prediction associated with the radio connection service for each radio service provider. Accordingly, an operation can be achieved in such a manner that the list of the labels of the plurality of radio service providers is displayed and it is possible to display at least one of the cost associated with the radio connection service provided by the radio service provider to be displayed, the radio connection quality associated with the radio connection service, the congestion degree associated with the radio connection service, and the congestion degree prediction associated with the radio connection service for each radio service provider.

In the embodiment of the disclosure, the transmission control unit may transmit, as the acquisition request, an acquisition request for acquiring new contract authentication information other than the contract authentication information retained in the retaining unit. The control unit may rewrite the contact authentication information retained in the retaining unit with the received contract authentication information. Accordingly, an operation can be achieved in such a manner that the acquisition request for acquiring the new contract authentication information other than the contract authentication information retained in the retaining unit is transmitted and the contact authentication information retained in the retaining unit is rewritten with the received contract authentication information.

According to another embodiment of the disclosure, there are provided a communication system, a method of controlling the communication system, and a program causing a computer to execute the method. The communication system includes a radio terminal apparatus and an information processing apparatus. The radio terminal apparatus includes a transmission control unit which transmits an acquisition request for acquiring contract authentication information via a radio channel when a predetermined operation of acquiring the contract authentication information associated with radio service providers providing a radio connection service is received; a reception unit which receives the contract authentication information transmitted via the radio channel in response to the acquisition request; and a control unit which controls writing the received contract authentication information in a retaining unit. The information processing apparatus includes a selection unit which specifies a location where the radio terminal apparatus exists when receiving the acquisition request, extracting the radio service providers providing the radio connection service at the location among the plurality of radio service providers, and selecting one radio service provider among the extracted radio service providers; and a control unit which controls transmitting the contract authentication information associated with the selected radio service provider to the radio terminal apparatus. Accordingly, an operation can be achieved in such a manner that the radio terminal apparatus transmits the acquisition request for acquiring the contract authentication information to the information processing apparatus via the radio channel when receiving the predetermined operation and writes the received contract authentication information in the retaining unit when receiving the contract authentication information transmitted via the radio channel in response to the acquisition request; and the information processing apparatus performs control so as to specify the location where the radio terminal apparatus exists when receiving the acquisition request, extracting the radio service providers providing the radio connection service at the location among the plurality of radio service providers, select one radio service provider among the extracted radio service providers, and transmit the contract authentication information associated with the selected radio service provider to the radio terminal apparatus.

According to the embodiments of the disclosure, it is possible to obtain the advantage of easily using the contract authentication information appropriate to the use region of the radio terminal apparatus.

BRIEF DESCRIPTION OF THE DRAWINGS

FIGS. 3A and 3B are diagrams schematically illustrating a radio service provider database according to the first embodiment of the disclosure;

FIG. 4 is a block diagram illustrating an example of the inner configuration of a radio terminal apparatus according to the first embodiment of the disclosure;

FIG. 8 is a diagram illustrating an example of a display screen displayed on the display unit according to the first embodiment of the disclosure;

FIG. 9 is a diagram illustrating a sequence chart of the communication process between apparatuses of the communication system according to the first embodiment of the disclosure;

FIG. 13 is a diagram illustrating a sequence chart of the communication process between apparatuses of the communication system according to the second embodiment of the disclosure.

DETAILED DESCRIPTION OF EMBODIMENTS

Hereinafter, modes (hereinafter, referred to embodiments) for carrying out the disclosure will be described. The description will be made in the following order.

1. First Embodiment (USIM (Universal Subscriber Identity Module) Information Acquisition Control: Example where Plurality of Radio Terminal Apparatuses Is Displayed and Desired Radio Service Provider Is Selected by User Operation)

2. Second Embodiment (USIM Information Acquisition Control: Example where Desired Radio Service Provider Is Selected Among Plurality of Radio Terminal Apparatuses Based on Radio Service Provider Selection Information Set through User Operation)

1. First Embodiment

Example of Configuration of Communication System

Figure 1:
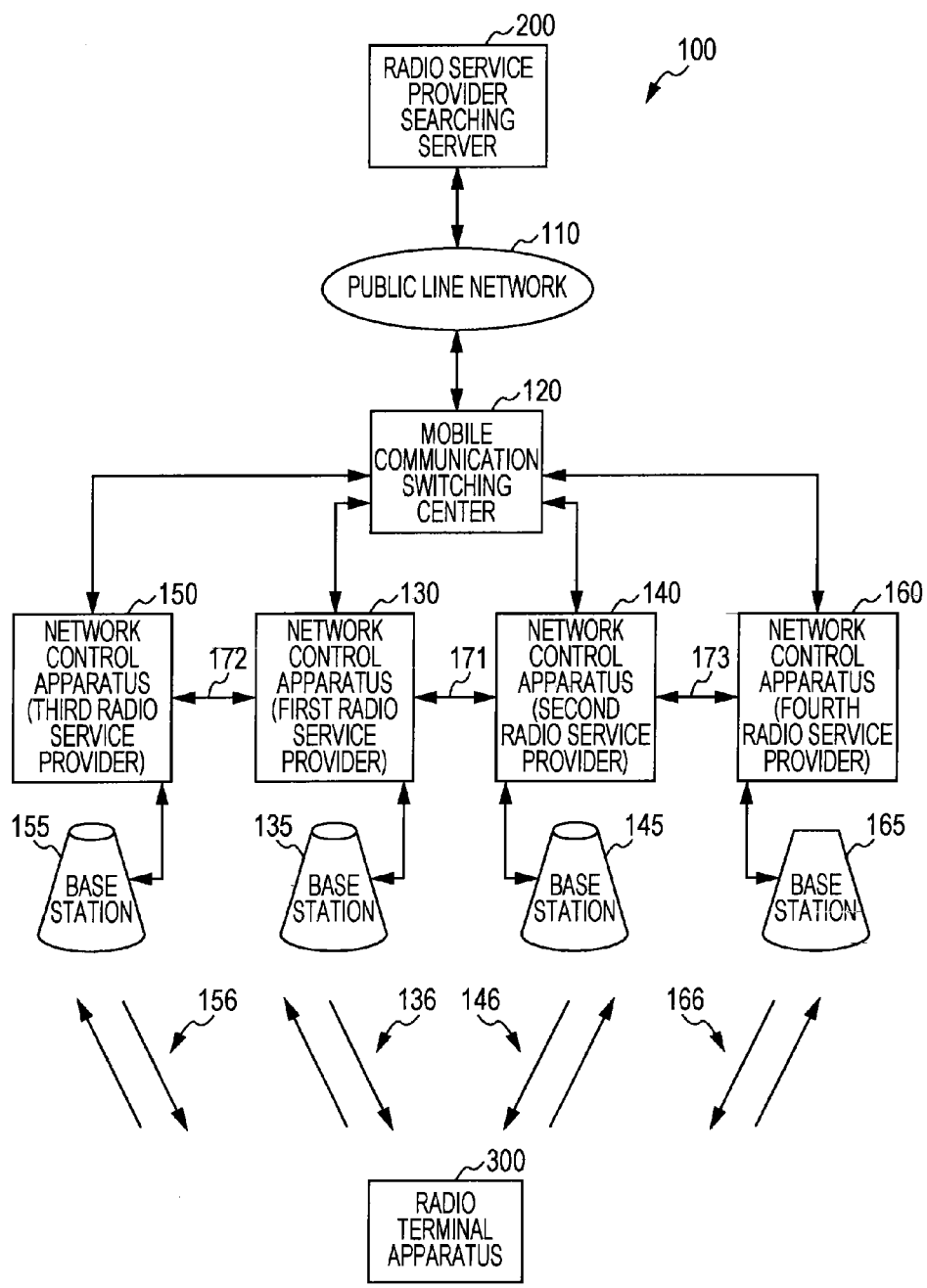
FIG. 1 is a block diagram illustrating an example of the system configuration of a communication system according to a first embodiment of the disclosure.

FIG. 1 is a block diagram illustrating an example of the configuration of a communication system 100 according to a first embodiment of the disclosure.

The communication system 100 includes a public line network 110, a mobile communication switching center 120, network control apparatuses 130, 140, 150, and 160, base stations 135, 145, 155, and 165, a radio service provider searching server 200, and a radio terminal apparatus 300.

The public line network 110 is a public line network such as a telephone network or the Internet.

The mobile communication switching center 120 is an interface (MSC (Mobile-services Switching Center)) between a fixed network (the public line network 110) and a mobile communication network.

The base station 135 is a mobile communication base station (NodeB) which connects the radio terminal apparatus 300 and the network control apparatus 130 to each other via a radio channel 136. The radio terminal apparatus 300 is connected to the base station 135 via the radio channel 136 and is connected to the network control apparatus 130 via the base station 135. Further, the radio terminal apparatus 300 can be connected to the radio service provider searching server 200 via the network control apparatus 130. The same is applied to relationships among the network control apparatuses 140, 150, and 160, the base stations 145, 155, and 165, the radio channels 146, 156, 166, and the radio terminal apparatus 300.

The network control apparatus 130 is a communication control apparatus which is managed by a first radio service provider providing a radio connection service. The network control apparatus 140 is a communication control apparatus which is managed by a second radio service provider providing a radio connection service. The network control apparatus 150 is a communication control apparatus which is managed by a third radio service provider providing a radio connection service. The network control apparatus 160 is a communication control apparatus which is managed by a fourth radio service provider providing a radio connection service. The network control apparatus 130 performs authentication control on the radio terminal apparatus connected via the base station 135. The same is applied to the network control apparatuses 140, 150, and 160.

The network control apparatus 130 authenticates only the radio terminal apparatus retaining USIM information (contract authentication information) among the radio terminal apparatuses connected via the base station 135 except for a specific case. Here, the USIM information is an example of the contract authentication information and is information which includes a telephone subscriber and an authentication key (Authentication). The specific case will be described in detail with reference to FIG. 5. The same is applied to the network control apparatuses 140, 150, and 160.

The network control apparatuses 130, 140, 150, and 160 connect the authenticated radio terminal apparatus to the public line network 110 via the mobile communication switching center 120. The network control apparatuses 130, 140, 150, and 160 are connected to each other through communication lines (communication lines 171 to 173 or the like) such as a dedicated line or a communication network such as a telephone network, the Internet, or a local network. In FIG. 1, parts of the communication lines are not illustrated.

The radio service provider searching server 200 is a server which searches for a radio service provider to which the radio terminal apparatus 300 can be connected when the radio service provider searching server 200 can receive a USIM information acquisition request from the radio terminal apparatus 300. The radio service provider searching server 200 will be described in detail with reference to FIG. 2. Further, the radio service provider searching server 200 is an example of an information processing apparatus described in another embodiment of the disclosure.

Example of Configuration of Radio Service Provider Searching Server

Figure 2:
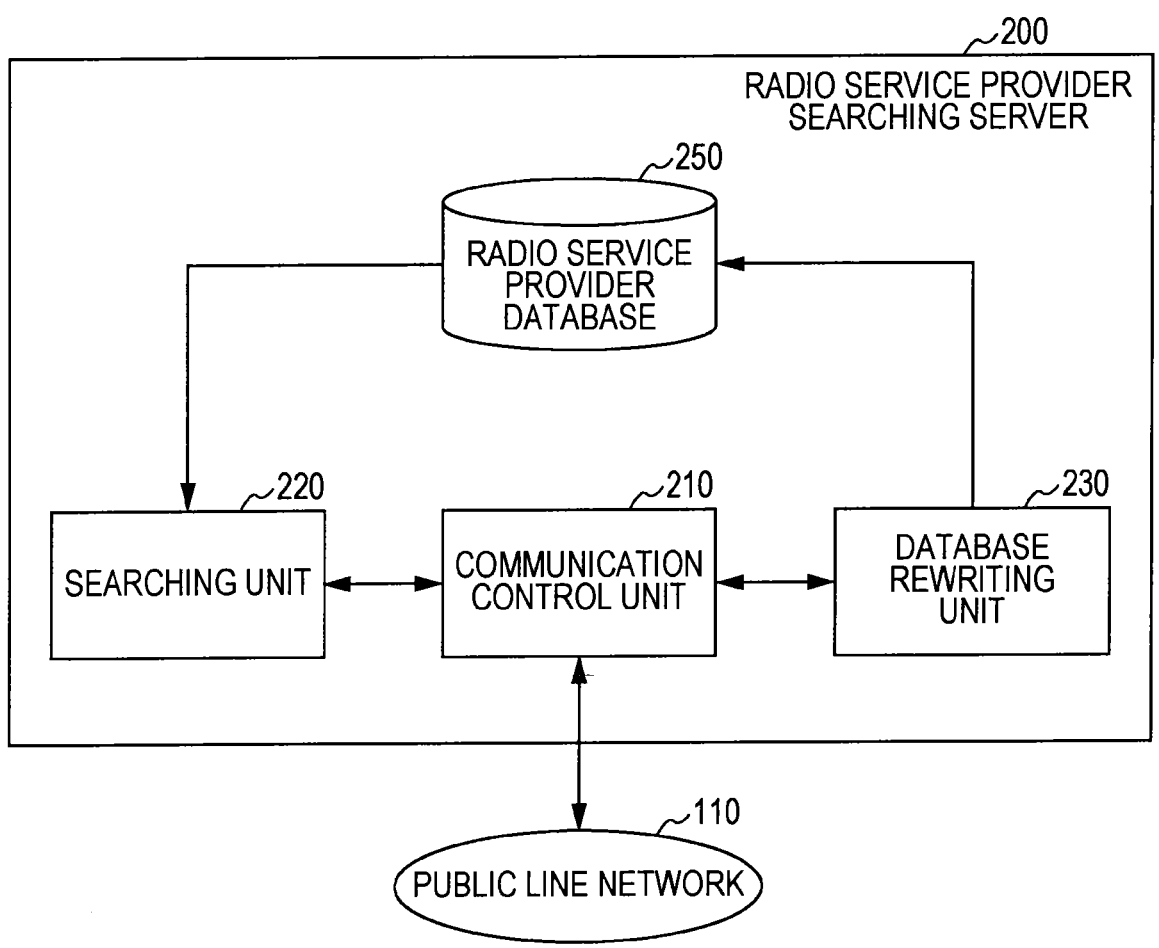
FIG. 2 is a block diagram illustrating an example of the functional configuration of a radio service provider searching server according to the first embodiment of the disclosure.

FIG. 2 is a block diagram illustrating an example of the functional configuration of the radio service provider searching server 200 according to the first embodiment of the disclosure.

The radio service provider searching server 200 includes a communication control unit 210, a searching unit 220, a database rewriting unit 230, and a radio service provider database 250.

The communication control unit 210 is connected to the public line network 110 and controls communication between communication apparatuses connected to each other via the public line network 110. For example, the communication control unit 210 performs the control so the USIM information associated with the radio service provider selected by the radio terminal apparatus 300 or the searching unit 220 is transmitted to the radio terminal apparatus 300. Further, the communication control unit 210 is an example of a control unit described in an embodiment of the disclosure.

The searching unit 220 searches for the radio service provider to which the radio terminal apparatus 300 can be connected and outputs the search result to the communication control unit 210, when the searching unit 220 can receive the USIM information acquisition request from the radio terminal apparatus 300. Specifically, when the communication control unit 210 receives the USIM information acquisition request, the searching unit 220 specifies a location where the radio terminal apparatus 300 exists and extracts radio service providers, which can provide a radio connection service at the location, among a plurality of radio service providers. Further, the searching unit 220 selects one radio service provider among the extracted radio service providers based on radio service provider selection information (information regarding a preference condition (selection condition)) set based on a user operation. The searching unit 220 is an example of a selection unit described in another embodiment of the disclosure.

The database rewriting unit 230 rewrites record contents of the radio service provider database 250 based on radio service provider information (various kinds of information regarding the radio service provider) acquired from each radio service provider via the public line network 110. The database rewriting unit 230 rewrites the contents of congestion degree information 255 (which is shown in FIG. 3) based on a use situation or the like (for example, a use ratio of radio channels in a base station of the radio service provider) acquired from each radio service provider.

The radio service provider database 250 is a database which stores various kinds of information (radio service provider information) regarding the radio service provider providing a radio connection service to the radio terminal apparatus 300. The radio service provider information stored in the radio service provider database 250 will be described in detail with reference to FIG. 3.

Example of Configuration of Radio Service Provider Database

Figure 3B:
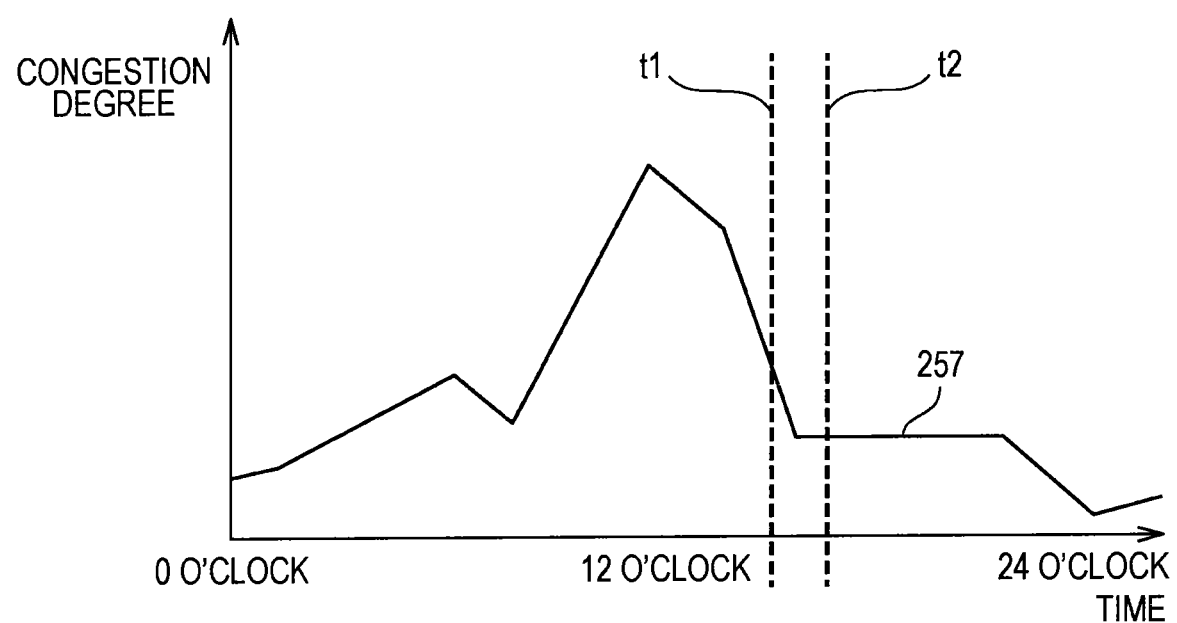

FIGS. 3A and 3B are diagrams schematically illustrating the radio service provider database 250 according to the first embodiment of the disclosure. In FIG. 3A, the radio service provider database 250 is schematically illustrated. In FIG. 3B, a calculation example of congestion degree prediction information stored in the radio service provider database 250 is schematically illustrated.

The radio service provider database 250 stores a service provider name 251, a corresponding region 252, usage fee information 253, channel quality information 254, the congestion degree information 255, and congestion degree prediction information 256 in association therewith.

The service provider name 251 stores the names of the radio service providers providing the radio connection service. In the service provider name 251, for example, the names of the radio service providers (the first to fourth radio service providers) of the network control apparatuses 130, 140, 150, and 160 shown in FIG. 1 are stored.

The corresponding region 252 stores information regarding regions (service-enabled region) where the radio service provider can provide the radio connection service. For example, the corresponding region 252 stores location information (for example, data representing the latitude and longitude corresponding to the apexes of a polygon corresponding to the service-enabled region) used to specify the service-enabled region. In FIG. 3, the detailed location information is not described to facilitate the description.

The usage fee information 253 stores the usage fee for the radio connection service provided by the radio service provider. For example, the usage fee information 253 stores the usage fee in a unit time. As the usage fee, "1000 yen/250 MB" and the like are shown in FIG. 3 to facilitate the description and detailed values are not described.

The channel quality information 254 stores information regarding the quality of a radio channel associated with the radio connection service provided by the radio service provider. For example, the channel quality information 254 stores a communication rate of a radio channel as the quality of the radio channel. In FIG. 3, the communication rate of the radio channel is expressed only by "slow" and "fast" to facilitate the description and detailed values are not described.

The congestion degree information 255 stores information regarding the congestion degree of the radio channel associated with the radio connection service provided by the radio service provider. For example, the congestion degree information 255 stores channel congestion degree information as the congestion degree of the radio channel. For example, the congestion degree information of the radio channel is information which indicates a use ratio of the radio channel in a base station of a radio service provider. In FIG. 3, the congestion degree of the radio channel is expressed only by "excellent", "good", and "congested" to facilitate the description and detailed values are not described.

The congestion degree prediction information 256 stores information which indicates congestion degree prediction of the radio channel associated with the radio connection service provided by the radio service provider. For example, the congestion degree prediction information 256 stores prediction information of a channel congestion degree. For example, the prediction information of the channel congestion degree is calculated based on an aggregate result obtained by aggregating the channel congestion degree in each time (for example, minute unit) for days of a past predetermined period by the radio service provider. An example of the aggregate result is shown in FIG. 3B. In a graph shown in FIG. 3B, the vertical axis represents the channel congestion degree and the horizontal axis represents a time (day unit). In the graph shown in FIG. 3B, a broken curve 257 is a curve corresponding to the aggregate result obtained by aggregating the channel congestion degree in each time for days of a past predetermined period. For example, a time (prediction time) after one hour from a current time t1 is referred to as t2. In this case, an average value (that is, an average value of the broken curve 257 between the current time t1 and the prediction time t2) from the current time t1 to the prediction time t2 is used as the congestion degree prediction at the prediction time t2. In this way, the congestion degree predicted in the near future can be provided to the user by predicting the congestion degree of the near future.

Example of Configuration of Radio Terminal Apparatus

FIG. 4 is a block diagram illustrating an example of the inner configuration of the radio terminal apparatus 300 according to the first embodiment of the disclosure.

The radio terminal apparatus 300 includes an antenna 311, an antenna shared unit 312, a modulation unit 321, a demodulation unit 322, a control unit 330, a memory 340, and a USIM information storage unit 350. The radio terminal apparatus 300 further includes an operation unit 360, a display unit 370, a location information acquisition unit 380, a microphone 391, and a speaker 392. The radio terminal apparatus 300 is realized by a portable telephone apparatus capable of carrying out telephone call and data communication.

For example, when a reception process is performed, radio waves received by the antenna 311 are demodulated by the demodulation unit 322 via the antenna shared unit 312. Then, the demodulated reception data is supplied to the control unit 330. When the reception process is a call reception process, the demodulated reception data (voice data) is output as a voice from the speaker 392 via the control unit 330. The antenna 311, the antenna shared unit 312, and the demodulation unit 322 are an example of a reception unit described in an embodiment of the disclosure.

For example, when a transmission process is performed, transmission data output by the control unit 330 is modulated by the modulation unit 321. Then, the modulated transmission data is transmitted from the antenna 311 via the antenna shared unit 312. When the transmission process is a calling process, voice data input from the microphone 391 is modulated by the modulation unit 321 via the control unit 330. Then, the modulated transmission data (voice data) is transmitted from the antenna 311 via the antenna shared unit 312.

The control unit 330 performs various kinds of controls based on a control program stored in the memory 340. The control unit 330 is configured by, for example, a microprocessor. For example, the control unit 330, which is connected to the modulation unit 321 and the demodulation unit 322, performs transmission and reception of various kinds of data performed between the network control apparatuses 130, 140, 150, and 160 connected via the base stations 135, 145, 155, and 165. The control unit 330 is an example of a transmission control unit and a control unit described in an embodiment of the disclosure.

The memory 340 is a memory which stores the control program, the transmission data, the reception data, and the like used for the control unit 330 to perform various kinds of controls. The memory 340 is configured by, for example, a ROM (Read Only Memory) or a RAM (Random Access Memory).

The USIM information storage unit 350 is a memory which keeps the USIM information (contract authentication information). For example, a UICC (Universal Integrated Circuit) card may be used as the USIM information storage unit 350. Alternatively, a dedicated memory securely retaining the USIM information may be used as the USIM information storage unit 350. When the UICC card is used as the USIM information storage unit 350, USIM information is not written fixedly, but the UICC card for which the USIM information can be rewritten is used. That is, the UICC card for which the control unit 330 can rewrite the USIM information received from the antenna 311 and demodulated is used. The process of rewriting the USIM information can be realized as a rewriting process prescribed in the 3GPP (Third Generation Partnership Project). For example, the rewriting process is performed in a sales store of a mobile phone apparatus. The USIM information storage unit 350 is an example of a retaining unit described in an embodiment of the disclosure.

The control unit 330 transmits a USIM information acquisition request via the radio channel, when the control unit 330 can receive a predetermined operation to acquire the USIM information associated with the radio service provider providing the radio connection service. In this case, for example, the control unit 330 transmits the acquisition request via the radio channel through a restricted connection process performed only for restricted connection without using the USIM information retained in the USIM information storage unit 350.

The control unit 330 displays radio service provider information transmitted from the radio service provider searching server 200 on the display unit 370 (for example, a display screen 530 shown in FIG. 8). It is assumed that the operation unit 360 can receive a selection operation of selecting a desired radio service provider among the plurality of radio service providers associated with the radio service provider information displayed on the display unit 370. In this case, the control unit 330 transmits the acquisition request for acquiring the USIM information associated with the selected radio service provider to the radio service provider searching server 200.

The control unit 330 controls a process of writing the USIM information transmitted under the control of the radio service provider searching server 200 in the USIM information storage unit 350. Further, the control unit 330 transmits the acquisition request for acquiring new USIM information, when the USIM information is retained in the USIM information storage unit 350. In this case, the control unit 330 controls a process of rewriting the USIM information retained in the USIM information storage unit 350 with the USIM information transmitted under the control of the radio service provider searching server 200.

The operation unit 360 is an operation reception unit which receives an input operation executed by the user and outputs a signal corresponding to the received input operation to the control unit 330. For example, the operation unit 360 has various keys such as number keys or alphabet keys and receives a predetermined operation of acquiring the USIM information associated with the radio service provider providing the radio connection service.

The display unit 370 is a display unit which displays various kinds of information (character information, time information, and the like) under the control of the control unit 330. For example, the display unit 370 displays respective information (for example, display screens shown in FIGS. 6A to 8) regarding the process of acquiring the USIM information. For example, a display panel such as an organic EL (Electro-Luminescence) panel or an LCD (Liquid Crystal Display) panel can be used as the display unit 370. Further, the operation unit 360 and the display unit 370 can be integrally formed with a touch panel on which the user executes an input operation by touching or approaching a display surface of the touch panel with his or her finger.

The location information acquisition unit 380 acquires location information regarding a location where the radio terminal apparatus 300 exists and outputs the acquired location information to the control unit 330. For example, the location information acquisition unit 380 can be realized by a GPS unit which calculates location information based on a GPS signal received through a GPS (Global Positioning System) signal reception antenna (not shown). The calculated location information includes each of the location data regarding latitude, longitude, altitude, and the like when the GPS signal is received. Further, a location information acquisition apparatus can be used which acquires the location information in accordance with a method of acquiring different location information. For example, a location information acquisition apparatus may be used which extracts location information using access point information in a radio LAN (Local Area Network) and acquires the location information.

Example of Connection at USIM Information Acquisition Request

Hereinafter, a connection method of connecting the radio terminal apparatus retaining the USIM information to the public line network 110 will be described.

Even when the USIM information is not currently retained in a general mobile phone (that is, when a UICC card is not installed), connection for an emergency call can be formed. For example, a call request from a police or a fire station can be used as the emergency call.

For example, it is assumed that a mobile phone apparatus does not retain the USIM information and does not execute a telephone call. The mobile phone apparatus is in a state (Camped on Any Cell Mode in Idle mode) where the mobile phone apparatus selects an arbitrary base station (for example, a base station with high radio wave strength) capable of receiving a call without specifying the radio service providers. In this state, only when the user inputs a telephone number (emergency call number) of an emergency call registered in advance, the mobile telephone apparatus transmits an EMERGENCY SETUP signal as a transmission emergency call to an MSC via a mobile communication base station and an RNC. Then, the mobile phone apparatus enters a connected mode from the idle mode and thus enters a telephone call-enabled state.

In the first embodiment of the disclosure, it is assumed that access to a temporary network (the public line network 110) is gained to execute the USIM information acquisition request by expanding the above-described connection method.

For example, when the user dials a dedicated telephone number to execute the USIM information acquisition request, the access to the temporary network can be gained. Further, when the user operates a menu screen (for example, a display screen 500 shown in FIG. 6A) or an operation member (button or the like) installed on the side surface of the apparatus, the dedicated telephone number is transmitted to gain the access to the temporary network.

The access to the temporary network is executed by a random access process prescribed in the standardized 3GPP of the mobile communication system. For example, a priority (Access Category) can be set in the random access. The priority (Access Category) can be set for the USIM information acquisition request. Thus, the priority (Access Category) different from the emergency call can be set.

For example, when the radio terminal apparatus (the radio terminal apparatus of a request source) executes the access at the priority (Access Category) for the acquisition request of the USIM information, the radio terminal apparatus of the request source is provided with the restricted network connection. Further, after permission of the restricted connection process for the radio terminal apparatus of the request source, the radio terminal apparatus of the request source is notified of information (information associated with the USIM information acquisition request) from an apparatus (for example, the radio service provider searching server 200) of a request destination.

When the radio terminal apparatus of the request source retaining no USIM information is connected to the network through the restricted connection process, the network retains the restricted connection to the radio terminal apparatus of the request source. The network, which retains the restricted connection, ensures normal connection to the apparatus of the request destination so as to communicate information regarding the acquisition request of the USIM information.

Figure 5:
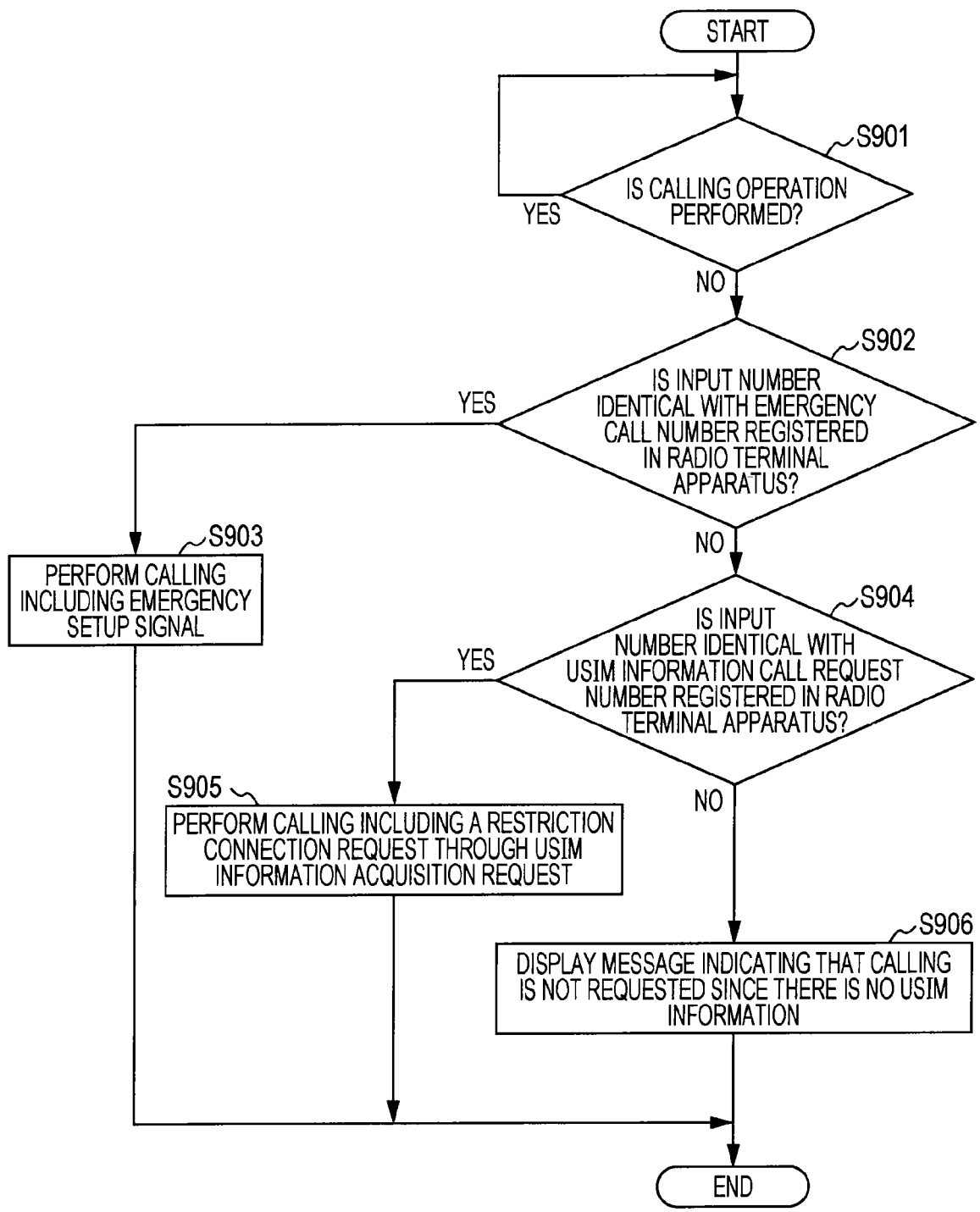
FIG. 5 is a flowchart illustrating an example of the processing order of a communication process performed by the radio terminal apparatus according to the first embodiment of the disclosure.

FIG. 5 is a flowchart illustrating an example of the processing order of a communication process performed by the radio terminal apparatus according to the first embodiment of the disclosure. Hereinafter, a case where the restricted connection process is performed through a calling operation by the radio terminal apparatus retaining no USIM information (or a case where the restricted connection process is performed without using the USIM information) will be described. A USIM information call request number is registered in the radio terminal apparatus. An example in which the USIM information call request number is used to perform the restricted connection process is shown.

First, it is determined whether a calling operation is performed (step S901). When the calling operation is not performed, monitoring continues.

On the other hand, when the calling operation is performed (step S901), it is determined whether a number input through the calling operation is identical to the emergency call number registered in the radio terminal apparatus (step S902). When the number input through the calling operation is identical to the emergency call number (step S902), the calling including the EMERGENCY SETUP signal is requested (step S903). Thus, the radio terminal apparatus enters the connected mode from the idle mode and thus enters a telephone call-enabled state.

On the other hand, when the number input through the calling operation is not identical to the emergency call number (step S902), it is determined whether the number input through the calling operation is identical to the USIM information call request number registered in the radio terminal apparatus (step S904). When the number input through the calling operation is identical to the USIM information call request number (step S904), a calling including a restricted connection request is requested through the USIM information acquisition request (S905). Thus, the radio terminal apparatus enters the connected mode from the idle mode and thus enters a telephone call-enabled state.

On the other hand, when the number input through the calling operation is not identical to the USIM information call request number (step S904), a message indicating that the calling may not be requested is displayed since no USIM information is retained (S906).

Example of Communication Between Apparatuses

FIGS. 6A to 8 are diagrams illustrating examples of display screens displayed on the display unit 370 according to the first embodiment of the disclosure. The display screens will be described in detail with reference to the sequence chart shown in FIG. 9.

FIG. 9 is a diagram illustrating the sequence chart of the communication process between apparatuses of the communication system 100 according to the first embodiment of the disclosure. FIG. 9 shows an example in which the USIM information acquisition request is made without using the USIM information retained by the radio terminal apparatus 300.

First, a display screen used to perform an operation of acquiring the USIM information is displayed on the display unit 370 of the radio terminal apparatus 300.

Figure 6A:
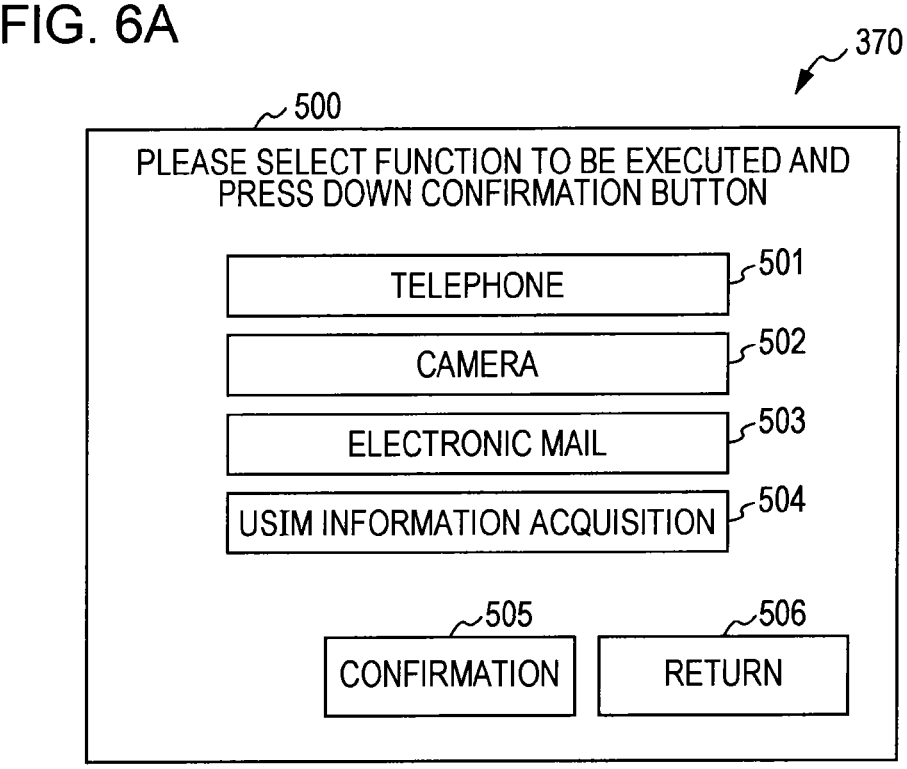
FIGS. 6A and 6B are diagrams illustrating examples of display screens displayed on a display unit according to the first embodiment of the disclosure.

FIG. 6A shows an example (display screen 500) of the display screen used to perform the operation of acquiring the USIM information. The display screen 500 is a display screen used to select a function to be executed in the radio terminal apparatus 300. Specifically, a telephone button 501, a camera button 502, an electronic mail button 503, a USIM information acquisition button 504, a confirmation button 505, and a return button 506 are formed on the display screen 500.

The telephone button 501 is a button which is pressed down when a telephone call function is used. The camera button 502 is a button which is pressed down when a camera function is used. The electronic mail button 503 is a button which is pressed down when an electronic mail function is used.

The USIM information acquisition button 504 is a button which is pressed down when the USIM information of a new radio service provider is acquired.

The confirmation button 505 is a button which is pressed down when the pressing operation of selecting one of the telephone button 501, the camera button 502, the electronic mail button 503, and the USIM information acquisition button 504 is executed and then the selection is confirmed.

The return button 506 is a button which is pressed down when the current display screen is returned to the display screen displayed previously, for example. The same is applied to return buttons 514, 526, 536, and 555 shown in FIGS. 6B, 7, 8, and 12, respectively.

When the USIM information acquisition button 504 is pressed down and the confirmation button 505 is pressed down on the display screen 500 shown in FIG. 6A, a display screen used to determine a selection method of selecting the radio service provider is displayed on the display unit 370.

Figure 6B:
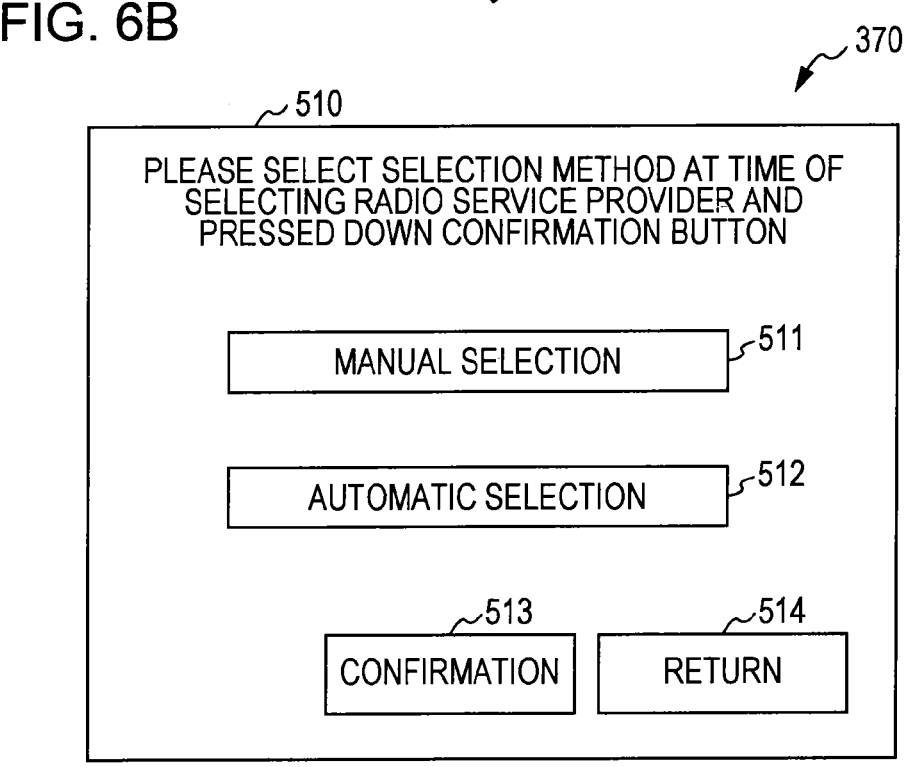

FIG. 6B shows an example of the display screen (display screen 510) used to determine the selection method. The display screen 510 is a display screen used to determine the selection method at the time of selecting the radio service provider. Specifically, a manual selection button 511, an automatic selection button 512, a confirmation button 513, the return button 514 are formed on the display screen 510.

The manual selection button 511 is a button which is pressed down when a selection method selected by a manual operation of the user is determined as the selection method at the time of selecting the radio service provider.

The automatic selection button 512 is a button which is pressed down when a selection method selected automatically is determined as the selection method at the time of selecting the radio service provider. A case where the automatic selection button 512 is pressed down will be described in a second embodiment of the disclosure.

The confirmation button 513 is a button which is pressed down when an operation of pressing down the manual selection button 511 or the automatic selection button 512 is executed and the operation is confirmed.

When the manual selection button 511 is pressed down and the confirmation button 513 is pressed down on the display screen 510 shown in FIG. 6B, a display screen used to determine an item (display item) displayed when the user selects the radio service provider is displayed on the display unit 370.

Figure 7:
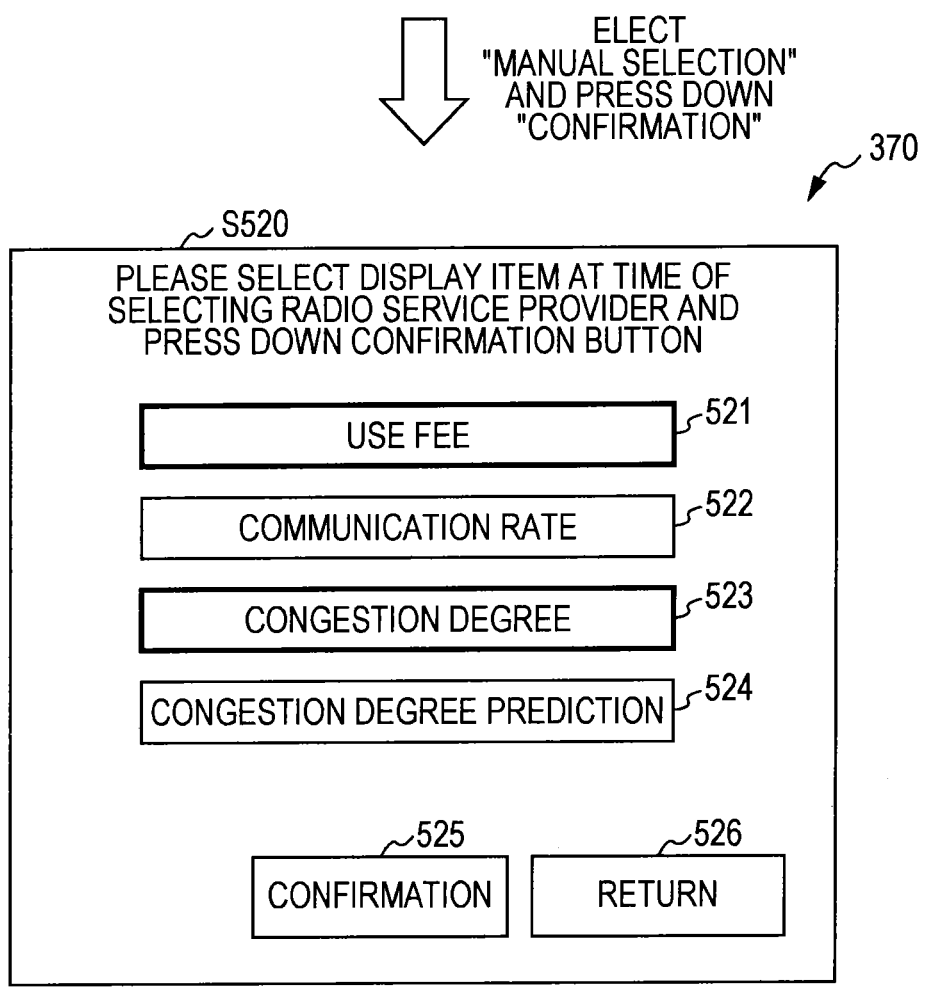
FIG. 7 is a diagram illustrating an example of a display screen displayed on the display unit according to the first embodiment of the disclosure.

FIG. 7 shows an example in which the display screen (display screen 520) used to determine the display item. The display screen 520 is a display screen used to determine the display item when the user selects the radio service provider. Specifically, a usage fee button 521, a communication rate button 522, a congestion degree button 523, a congestion degree prediction button 524, a confirmation button 525, and the return button 526 are formed on the display screen 520.

The usage fee button 521 is a button which is pressed down at the time of determining a usage fee as a display item when the user selects the radio service provider.

The communication rate button 522 is a button which is pressed down at the time of determining the communication rate as a display item when the user selects the radio service provider.

The congestion degree button 523 is a button which is pressed down at the time of determining the congestion degree as a display item when the user selects the radio service provider.

The congestion degree prediction button 524 is a button which is pressed down at the time of determining the congestion degree prediction as a display item when the user selects the radio service provider. Further, it is assumed that the user can select a single or a plurality of display items.

The confirmation button 525 is a button which is pressed down when the user operates at least one of the usage fee button 521, the communication rate button 522, the congestion degree button 523, and the congestion degree prediction button 524 and then confirms the operation.

Here, it is assumed that the user presses down the usage fee button 521 and the congestion degree button 523 on the display screen 520 shown in FIG. 7, and then presses down the confirmation button 525 (401). When the operation of acquiring the USIM information is executed (401), the USIM information acquisition request is transmitted from the radio terminal apparatus 300 to the radio service provider searching server 200 via one radio service provider (402 and 403). The USIM information acquisition request is transmitted from the radio terminal apparatus 300 to the network control apparatus by the above-described restricted connection process. In this example, a case where the USIM information acquisition request is transmitted from the radio terminal apparatus 300 to the network control apparatus 130 will be described.

The USIM information acquisition request includes location information used to specify the location where the radio terminal apparatus 300 exists. For example, the control unit 330 can include location information acquired by the location information acquisition unit 380 in the USIM information acquisition request and can transmit the location information (402). For example, the network control apparatus 130 can include the location information specified based on the location of the base station 135 in the USIM information acquisition request transmitted from the radio terminal apparatus 300 and can transmit the location information.

The USIM information acquisition request includes terminal identification information used to identify the radio terminal apparatus 300 and route information between the radio terminal apparatus 300 and the radio service provider searching server 200. For example, a telephone number, an electronic mail address, or an IMEI (International Mobile Equipment Identity) can be used as the terminal identification information. For example, radio service provider identification information used to identify the radio service provider to which the radio terminal apparatus 300 is currently connected can be used as the route information.

The USIM information acquisition request includes information (display item information) regarding the display item determined on the display screen 520 shown in FIG. 7.

Subsequently, when the radio service provider searching server 200 receives the USIM information acquisition request (403), the radio service provider to which the radio terminal apparatus 300 can be connected is searched based on the location information included in the received USIM information acquisition request (404). Specifically, the searching unit 220 searches the radio service provider to which the radio terminal apparatus 300 can be connected by the use of the corresponding region 252 of the radio service provider database 250 (404). For example, the searching unit 220 extracts a region including the location information of the USIM information acquisition request among respective regions stored in the corresponding region 252 of the radio service provider database 250 and extracts the radio service provider which can be associated with the extracted region. In this example, it is assumed that the first to fourth radio service providers are extracted.

Subsequently, the radio service provider searching server 200 transmits the radio service provider information (for example, only the item associated with the display item information included in the USIM information acquisition request) regarding the extracted radio service providers to the radio terminal apparatus 300 via the network control apparatus 130 (405 and 406).

When the radio terminal apparatus 300 receives the radio service provider information (406), the radio terminal apparatus 300 displays the display screen on the display unit 370 to select the radio service provider based on the received radio service provider information (407).

FIG. 8 shows an example of the display screen (display screen 530) used to select the radio service provider. The display screen 530 is a display screen on which a list of a single or the plurality of radio service providers is displayed based on the radio service provider information transmitted from the radio service provider searching server 200 so that the user can select a desired radio service provider. Specifically, check columns 531, a radio service provider display region 532, a usage fee display region 533, a congestion degree display region 534, a confirmation button 535, and a return button 536 are formed on the display screen 530.

The check columns 531 are a column ticked with a mark (for example, "✓") when the user selects the radio service provider.

The radio service provider display region 532 is a region in which the names or the like of the radio service providers included in the radio service provider information transmitted from the radio service provider searching server 200 are displayed. FIG. 8 shows an example in which the labels representing the first to fourth radio service providers are displayed in the radio service provider display region 532.

The usage fee display region 533 and the congestion degree display region 534 are regions in which the display items determined by the operation of the user are displayed. For example, information (display item information) regarding the display items determined on the display screen 520 shown in FIG. 7 is displayed. Further, the display item information displayed in the usage fee display region 533 and the congestion degree display region 534 corresponds to recording contents (for example, the usage fee information 253 and the congestion degree information 255 shown in FIG. 3A) of the radio service provider database 250.

The confirmation button 535 is a button which is pressed down when the operation of ticking the "✓" mark is performed in the check column 531 to select the radio service provider, and the operation is confirmed.

That is, the control unit 330 displays the list of the labels of the plurality of radio service providers on the display unit 370. Further, the control unit 330 displays, on the display unit 370, at least one of a fee associated with the radio connection service, a radio connection quality associated with the radio connection service, a congestion degree associated with the radio connection service, and a congestion degree prediction associated with the radio connection service for each radio service provider.

Here, it is assumed that the operation of ticking the "✓" mark in the check column 531 of the third radio service provider is performed on the display screen 530 shown in FIG. 7, and then the confirmation button 535 is pressed down (408). When the operation of selecting the radio service provider is performed (408), a USIM information delivery request for the selected radio service provider is transmitted from the radio terminal apparatus 300 to the radio service provider searching server 200 via the network control apparatus 130 (409 and 410).

When the radio service provider searching server 200 receives the USIM information delivery request (410), the radio service provider searching server 200 transmits the USIM information delivery request to the selected radio service provider (411). In this example, since the third radio service provider is selected, the radio service provider searching server 200 transits the USIM information delivery request to the network control apparatus 150 (411). The USIM information delivery request includes the terminal identification information and the route information included in the USIM information acquisition request from the radio terminal apparatus 300 in order to specify the radio service provider (the first radio service provider) to which the radio terminal apparatus 300 is currently connected.

The radio service provider (the network control apparatus 150) receiving the USIM information delivery request (412) transmits the USIM information used to connect the radio terminal apparatus 300 to this radio service provider to the radio terminal apparatus 300. However, when the radio service provider receiving the USIM information delivery request is not connected to the radio terminal apparatus 300, the radio service provider is not able to directly transmit the USIM information to the radio terminal apparatus 300. In this case, the radio service provider receiving the USIM information delivery request (412) transmits the USIM information to the radio terminal apparatus 300 via the radio service provider connected to the radio terminal apparatus 300 (413 and 414).

Specifically, the network control apparatus 150 receiving the USIM information delivery request (412) transmits the USIM information to the network control apparatus 130 via the communication line 172 (413). Further, the network control apparatus 130 transmitting the USIM information of the third radio service provider transmits the USIM information of the third radio service provider to the radio terminal apparatus 300 (413).

When the radio service provider receiving the USIM information delivery request is the same as the radio service provider to which the radio terminal apparatus 300 is currently connected, the USIM information can be transmitted directly to the radio terminal apparatus 300. In this case, the radio service provider receiving the USIM information delivery request (412) transmits the USIM information directly to the radio terminal apparatus 300 (413 and 414).

The radio terminal apparatus 300 receiving the USIM information of the third radio service provider (414) writes the USIM information in the USIM information storage unit 350 and performs change in the USIM information (415). The radio terminal apparatus 300 can communicate via the third radio service provider (the network control apparatus 150) through this change.

FIG. 9 shows the example in which the change in the USIM information is performed once by the radio terminal apparatus 300 at the time of the USIM information acquisition request to the radio service provider searching server 200. However, even after the change in the USIM information, the change in the USIM information may be performed plurality of times based on the operation of the user.

FIG. 9 shows the example in which only the items associated with the display item information included in the USIM information acquisition request as the radio service provider information transmitted from the radio service provider searching server 200 to the radio terminal apparatus 300 are transmitted (405 and 406). However, all the items to be displayed may be transmitted as the radio service provider information from the radio service provider searching server 200 to the radio terminal apparatus 300 and the display items may be changed in the radio terminal apparatus 300 through an operation of the user.

FIG. 9 shows the example in which the radio terminal apparatus 300 transmits the USIM information via the radio service provider connected through the restricted connection process (413 and 414). However, the radio service provider receiving the USIM information delivery request may perform a connection process to the radio terminal apparatus 300 and may directly transmit the USIM information to the radio terminal apparatus 300.

FIG. 9 shows the example in which the USIM information acquisition request is performed through the above-described restricted connection process without using the USIM information retained by the radio terminal apparatus 300 (402 and 403). However, the USIM information acquisition request may be performed using the USIM information retained by the radio terminal apparatus 300.

FIG. 9 shows the example in which the connection with one radio service provider starts through the above-described restricted connection process at the time of the USIM information acquisition request to the radio service provider searching server 200, the USIM information is acquired during the restricted connection process with the radio service provider, and change is performed. However, the USIM information of another radio service provider may be acquired during the connection with the radio service provider using the USIM information retained by the radio terminal apparatus 300 (the USIM information storage unit 350), and the change may be performed. The following two cases (1) and (2) are assumed as a change case of the radio service provider.

(1) A case is assumed where the radio service provider is changed depending on a content item to be used by the use of the radio terminal apparatus 300. For example, it is assumed that a game, for which the communication rate is preferred, and browsing a document, for which the communication rate may be slow but data is desired to be downloaded at low cost, are used by the use of the radio terminal apparatus 300. The unit cost per packet of the radio service provider A is higher than that of the radio service provider B. In this case, when the user attempts to play the game using the radio terminal apparatus 300, it is assumed that the radio terminal apparatus 300 is connected to the radio service provider A providing the fast communication rate. In this state, when the user switches from the game to the document browsing, it is assumed that the radio service provider is changed to the radio service provider B providing the low unit cost per packet since the user desires to download data at low cost in spite of the fact that the communication rate is slow.

(2) A case is assumed where there is a radio service provider providing a time-limited service of the packet unit cost and the radio service provider is changed depending on the time of the time-limited service. For example, it is assumed that the radio service provider A provides the time-limited service of the packet unit cost and the packet unit cost of the radio service provider A is lower than that of the radio service provider B within the time of the time-limited service. However, it is assumed that after the time of the time-limited service of the radio service provider A elapses, the packet unit cost of the radio service provider A is higher than that of the radio service provider B. In this case, when the current time is within the time-limited service, the user connects the radio terminal apparatus 300 to the radio service provider A. However, after the time of the time-limited service of the radio service provider A elapses, the radio terminal apparatus 300 is connected to the radio service provider B.

As shown in the above-described cases (1) and (2), it is assumed that the USIM information of the other radio service provider B is acquired during the connection to the radio service provider A based on the USIM information retained by the USIM information storage unit 350 and the change is performed. When the change is performed, it is not necessary to start a new connection since the radio terminal apparatus 300 has already been connected to the radio service provider A. Therefore, when the user executes the operation (operation of changing the USIM information) of acquiring the USIM information (401), the USIM information acquisition request is transmitted from the radio terminal apparatus 300 to the radio service provider searching server 200 via the radio service provider A to which the radio terminal apparatus 300 is being connected (402 and 403). The USIM information acquisition request may include information regarding the radio service provider B selected by the user. Further, the USIM information acquisition request is transmitted not through the above-described restricted connection process but through a normal connection process. When the operation (operation of changing the USIM information) of acquiring the USIM information is executed (401), the control unit 330 determines whether the radio service provider of the USIM information retained by the USIM information storage unit 350 is the same as the radio service provider associated with the operation of changing the USIM information. When the radio service provider of the USIM information retained by the USIM information storage unit 350 is the same as the radio service provider associated with the operation of changing the USIM information, the USIM information acquisition request is not transmitted since the change is not necessary.

When the radio service provider searching server 200 receives the USIM information delivery request (selection of the radio service provider B) from the radio terminal apparatus 300 (410), the radio service provider searching server 200 transmits the USIM information delivery request to the radio service provider B (411). When the USIM information acquisition request includes the information regarding the radio service provider B selected by the user and the radio service provider searching server 200 receives the USIM information acquisition request (403), the radio service provider searching server 200 transmits the USIM information delivery request to the radio service provider B (411). The radio service provider B (network control apparatus) receiving the USIM information delivery request (412) transmits, to the radio terminal apparatus 300, the USIM information used to connect the radio terminal apparatus 300 to the radio service provider B. In this case, the radio service provider B (412) transmits the USIM information to the radio terminal apparatus 300 via the radio service provider A connected to the radio terminal apparatus 300 (413 and 414).

The radio terminal apparatus 300 receiving the USIM information of the radio service provider B (414) writes the USIM information of the radio service provider B in the USIM information storage unit 350 and changes the USIM information (415). After the change, the radio terminal apparatus 300 disconnects the connection to the radio service provider A and establishes reconnection to the radio service provider B based on the USIM information of the radio service provider B.

Use Example of Radio Terminal Apparatus

Figure 10A:
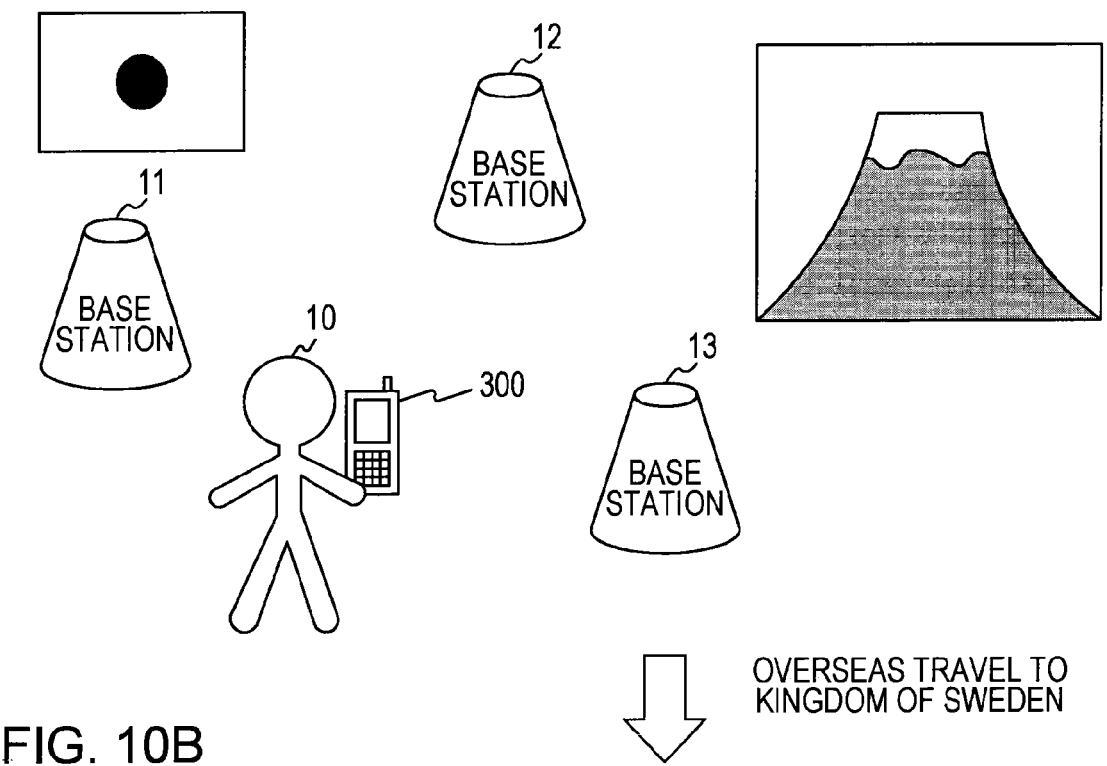
FIGS. 10A and 10B are diagrams a simple use example of the radio terminal apparatus according to the first embodiment of the disclosure.
Figure 10B:
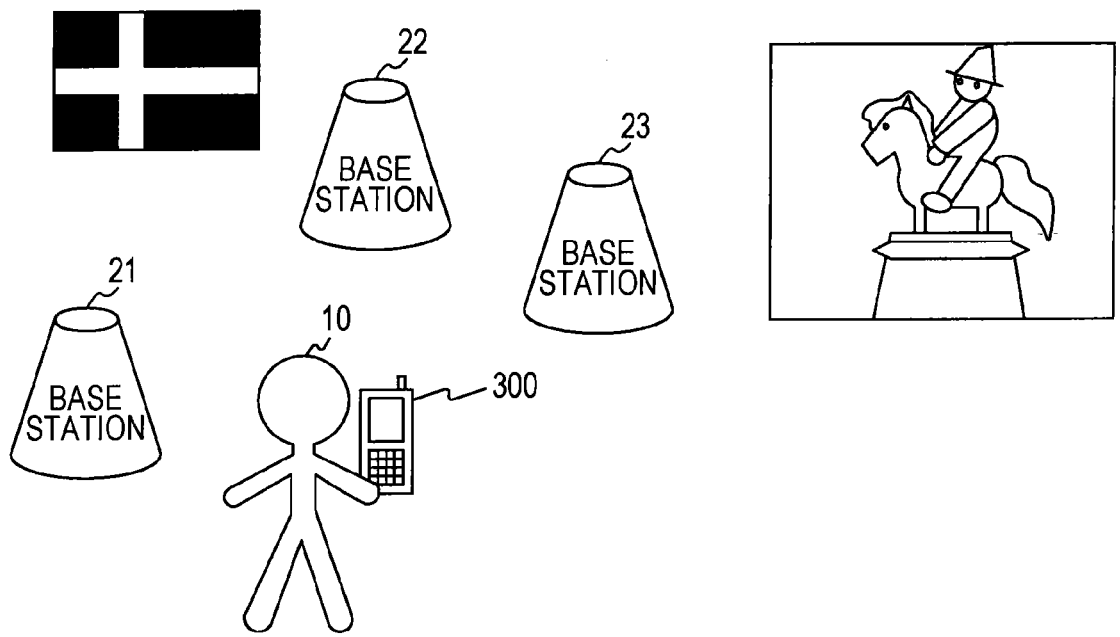

FIGS. 10A and 10B are diagrams illustrating a simple use example of the radio terminal apparatus 300 according to the first embodiment of the disclosure.

FIG. 10A shows a state where a user 10 uses the radio terminal apparatus 300 in Japan. FIG. 10B shows a state where the user 10 goes overseas and uses the radio terminal apparatus 300 in the nation (for example, the Kingdom of Sweden). In FIGS. 10A and 10B, base stations 11 to 13 and 21 to 23 of the radio service providers of each nation providing the radio connection service are shown.

As shown in FIGS. 10A and 10B, for example, it is assumed that the user 10 owning the radio terminal apparatus 300 which retains the USIM information of the radio service provider in Japan goes overseas and uses the radio terminal apparatus 300. In this case, the user 10 can establish radio connection using the USIM information in Japan through a roaming service of the radio service provider of the nation (Kingdom of Sweden) cooperated with the radio service provider of Japan. However, generally, the connection cost of the radio connection established through the roaming service is often expensive.

Accordingly, in the first embodiment of the disclosure, a radio service provider of the nation (Kingdom of Sweden) is selected using the radio terminal apparatus 300 before the radio connection starts using the USIM information in Japan. The radio connection service can be received at low cost in the nation by downloading the USIM information of the selected radio service provider and writing the USIM information in the USIM information storage unit 350. Thus, for example, the user has to search for the radio service providers of the nation to receive the radio connection service provided by the radio service providers of the nation. Further, it is not necessary to newly install a UICC card issued by the radio service provider of the nation in the radio terminal apparatus. Thus, it is possible to easily use the contract authentication information appropriate to the use region of the radio terminal apparatus.

Operation Example of Communication System

Next, an operation of the communication system 100 according to the first embodiment of the disclosure will be described with reference to the drawings.

Operation Example of Radio Terminal Apparatus

Figure 11:
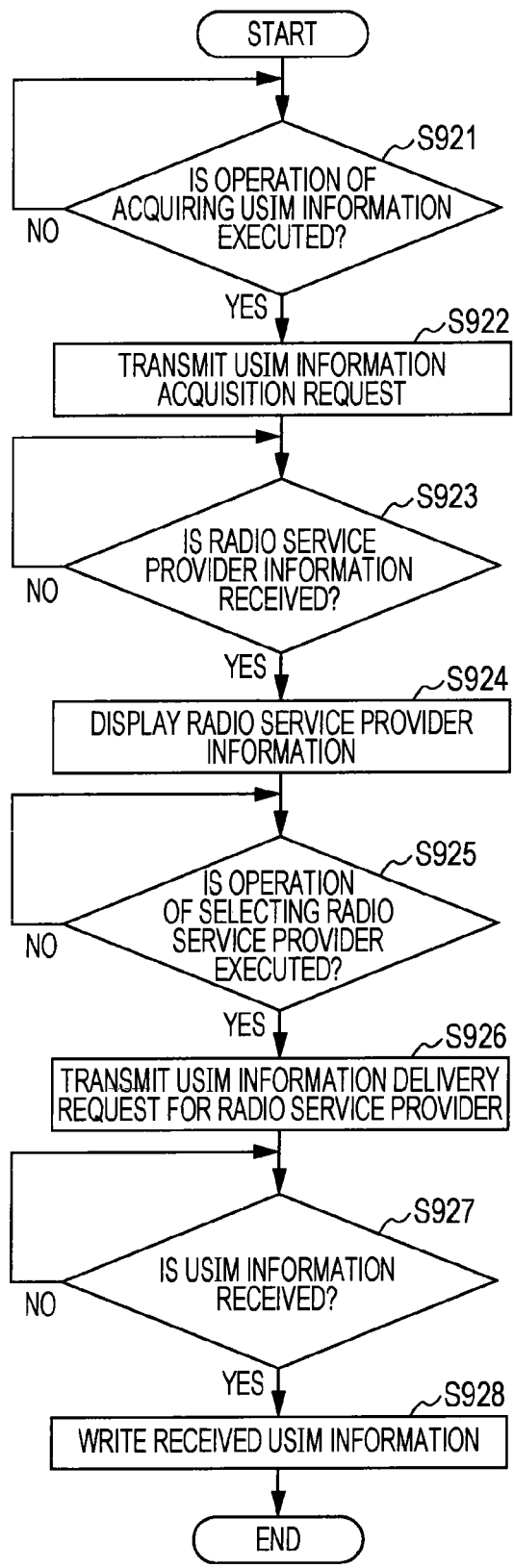
FIG. 11 is a flowchart illustrating an example of the processing order of the communication process performed by the radio terminal apparatus according to the first embodiment of the disclosure.

FIG. 11 is a flowchart illustrating an example of the processing order of the communication process performed by the radio terminal apparatus 300 according to the first embodiment of the disclosure.

First, the control unit 330 determines whether an operation of acquiring the USIM information is executed (step S921). When it is determined that the operation of acquiring the USIM information is not executed, monitoring continues.

On the other hand, when it is determined that the operation of acquiring the USIM information is executed (step S921), the control unit 330 transmits the USIM information acquisition request to the radio service provider searching server 200 via one radio service provider (step S922). The USIM information acquisition request is transmitted, for example, through the above-described restricted connection process. Steps S921 and S922 are an example of the transmitting described in still another embodiment of the disclosure.

Subsequently, the control unit 330 determines whether the radio service provider information regarding the radio service provider extracted by the radio service provider searching server 200 is not received (step S923). When it is determined that the radio service provider information is not received, monitoring continues. On the other hand, when the radio service provider information is received (step S923), the control unit 330 displays the received radio service provider information on the display unit 370 (step S924).

Subsequently, the control unit 330 determines whether an operation of selecting the radio service provider is executed on the radio service provider information displayed on the display unit 370 (step S925). When the control unit 330 determines that the operation of selecting the radio service provider is not executed, monitoring continues. On the other hand, when the control unit 330 determines that the operation of the selecting the radio service provider is executed (step S925), the control unit 330 transmits the USIM information delivery request for the selected radio service provider to the radio service provider searching server 200 (step S926). In this case, for example, the USIM information delivery request is transmitted through the above-described restricted connection process.

Subsequently, the control unit 330 determines whether the USIM information regarding the selected radio service provider is received (step S927). When the control unit 330 determines that the USIM information is not received, monitoring continues. On the other hand, when the control unit 330 determines that the USIM information is received (step S927), the control unit 330 writes the received USIM information in the USIM information storage unit 350 (step S928). Then, the operation of the communication process ends. Through the writing, the radio terminal apparatus 300 can perform communication via the radio service provider selected by the user. Step S927 is an example of the receiving described in still another embodiment of the disclosure. Further, step S928 is an example of the controlling described in still another embodiment of the disclosure.

2. Second Embodiment

In the first embodiment of the disclosure, the example has been described in which the desired radio service provider is selected by the manual operation of the user. However, for example, when the user sets a preference condition (selection condition) in advance and the desired radio service provider is automatically selected based on the selection condition, it is assumed that the selection process can be performed faster. Accordingly, in a second embodiment of the disclosure, an example in which the desired radio service provider is automatically selected will be described. Further, in the second embodiment of the disclosure, the configuration of the communication system is substantially the same as that shown in FIG. 1 and the like. Therefore, the same reference numerals are given to the same constituent elements as those of the first embodiment of the disclosure and the description thereof will not be partially repeated.

Example of Communication Between Apparatuses

Figure 12A:
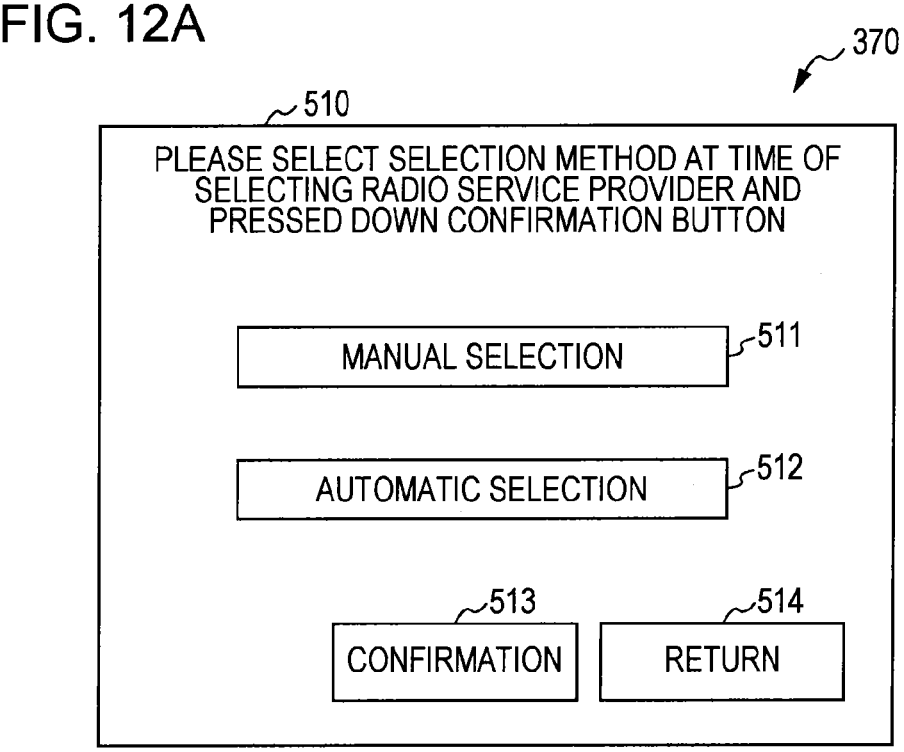
FIGS. 12A and 12B are diagrams illustrating examples of display screens displayed on a display unit according to a second embodiment of the disclosure.
Figure 12B:
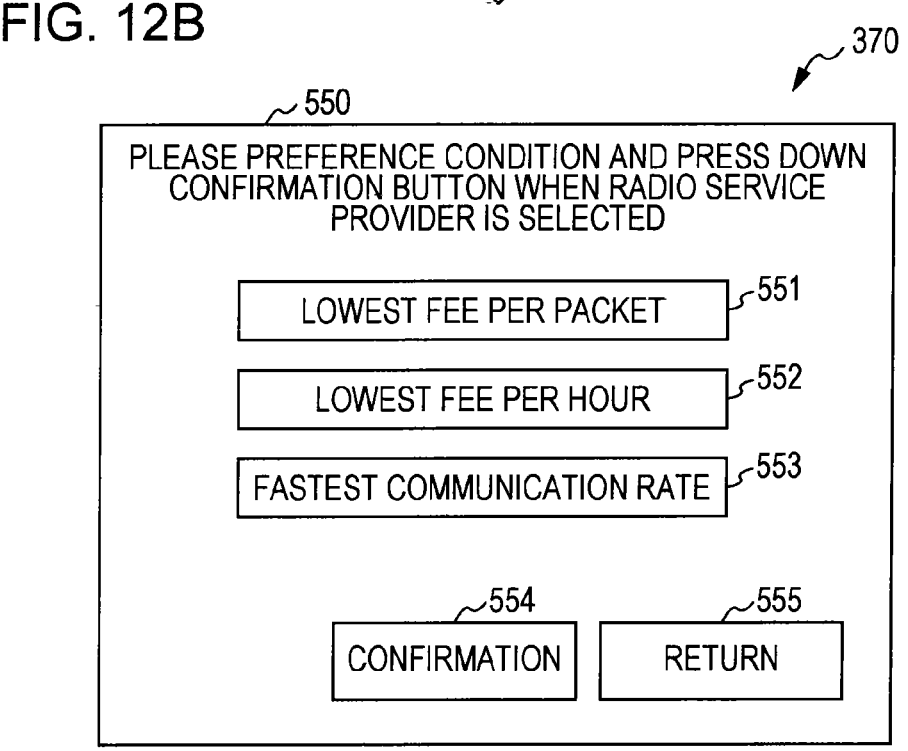

FIGS. 12A and 12B are diagrams illustrating examples of display screens shown on the display unit 370 according to the second embodiment of the disclosure. The display screens will be described in detail with reference to the sequence chart shown in FIG. 13. A display screen 510 shown in FIG. 12A is the same as that shown in FIG. 6B.

FIG. 13 is a diagram illustrating a sequence chart of a communication process between apparatuses of the communication system 100 according to the second embodiment of the disclosure. Since the sequence chart shown in FIG. 13 is a modified example of that of FIG. 9, the description of the same portions as those in FIG. 9 will not be partially repeated.

When the automatic selection button 512 is pressed down and the confirmation button 513 is pressed down on the display screen 510 shown in FIG. 12A, a display screen used to set the preference condition (selection condition) at the time of automatically selecting the radio service provider is displayed on the display unit 370.

FIG. 12B shows an example of a display screen (display screen 550) used to set the preference condition (selection condition). The display screen 550 is a display screen on which the user sets the preference condition (selection condition) at the time of automatically selecting the radio service provider. Specifically, preference condition selection buttons 551 to 553, a confirmation button 554, and a return button 555 are formed on the display screen 550.

The preference condition selection buttons 551 to 553 are buttons which are pressed down when the preference condition (selection condition) is set at the time of automatically selecting the radio service provider.

For example, when the preference condition selection button 551 is pressed down, the radio service provider providing the lowest fee per packet is selected among the radio service providers extracted by the radio service provider searching server 200. For example, when the preference condition selection button 552 is pressed down, the radio service provider providing the lowest fee per hour is selected among the radio service providers extracted by the radio service provider searching server 200. For example, when the preference condition selection button 553 is pressed down, the radio service provider providing the fastest communication rate is selected among the radio service providers extracted by the radio service provider searching server 200.

The confirmation button 554 is a button which is pressed down when one of the preference condition selection buttons 551 to 553 is pressed down and then the operation is confirmed.

In FIG. 12B, the example has been described in which the preference condition (selection condition) is set using the preference condition selection buttons 551 to 553. However, detailed setting can be performed, for example, in such a manner that one of the communication rate and the usage fee is preferred in accordance with a day of the week or a time. Further, detailed setting can be performed, for example, in such a manner that the communication rate or the usage fee is preferred in accordance with a content item that the user uses using the radio terminal apparatus 300. For example, the setting can be performed depending on whether a content item is used in so-called net surfing (normal browsing of web pages) or a content item used in streaming reproduction of a moving image.

Here, it is assumed that one of the preference condition selection buttons 551 to 553 is pressed down and the confirmation button 554 is pressed down on the display screen 550 shown in FIG. 12B (421). When the operation of acquiring the USIM information is executed (421), the USIM information acquisition request is transmitted from the radio terminal apparatus 300 to the radio service provider searching server 200 via one radio service provider (422 and 423). The USIM information acquisition request includes information regarding the preference condition (selection condition) set on the display screen 550 shown in FIG. 12B.

The radio service provider searching server 200 searches for the radio service providers to which the radio terminal apparatus 300 can be connected, based on the location information included in the received USIM information acquisition request (424). Subsequently, the radio service provider searching server 200 selects the optimum radio service provider among the radio service providers extracted through the searching process based on the radio service provider selection information included in the received USIM information acquisition request (425).

Specifically, the searching unit 220 selects the optimum radio service provider using the radio service provider database 250 (shown in FIG. 3A) among the radio service providers extracted based on the location information (425). That is, the optimum radio service provider is selected using the usage fee information 253, the channel quality information 254, the congestion degree information 255, and the congestion degree prediction information 256 shown in FIG. 3A (425).

When the selection process is performed in this way (425), the selection process is performed based on the radio service provider selection information included in the USIM information acquisition request. For example, when the preference condition selection button 553 is pressed down and the confirmation button 554 is pressed down, the radio service provider providing the fastest communication rate is selected. Specifically, the searching unit 220 extracts the radio service provider (third radio service provider) providing the fastest communication rate of the radio channel from the channel quality information 254 of the radio service provider database 250 and selects this radio service provider as the optimum radio service provider. The selection method described herein is merely an example and another selection method (for example, a selection method based on two preference conditions) may be used.

When only one radio service provider is extracted as the radio service provider to which the radio terminal apparatus 300 can be connected, the above-described selection process is not performed and the extracted radio service provider is selected as the optimum radio service provider.

Subsequently, the radio service provider searching server 200 transmits the USIM information delivery request to the selected radio service provider (426). In this example, since the third radio service provider is selected, the radio service provider searching server 200 transmits the USIM information delivery request to the network control apparatus 150 (426). Since the respective processes (427 to 430) subsequent to the transmission of the USIM information delivery request are substantially the same as the respective processes (412 to 415) shown in FIG. 9, the description thereof will not be repeated.

FIG. 13 shows an example in which the preference condition (selection condition) is set on the display screen 550, the USIM information acquisition request including the radio service provider information regarding the preference condition is transmitted to the radio service provider searching server 200, and the radio service provider searching server 200 is selected as the optimum radio service provider. However, the radio service provider selection information may be retained in the radio terminal apparatus 300 without transmitting the radio service provider selection information to the radio service provider searching server 200 and the radio terminal apparatus 300 may select the optimum radio service provider based on the radio service provider information from the radio service provider searching server 200.

Specifically, the radio terminal apparatus 300 retains the preference condition (selection condition) set on the display screen 550 (421). As in the example shown in FIG. 9, the radio terminal apparatus 300 transmits the USIM information acquisition request (not including radio service provider selection information) to the radio service provider searching server 200 (402 and 403). Then, the radio service provider searching server 200 transmits the radio service provider information to the radio terminal apparatus 300 (404 to 406). When the radio terminal apparatus 300 receives the radio service provider information (406), the radio terminal apparatus 300 selects the optimum radio service provider based on the retained preference condition (selection condition). In this way, the selection process (425) shown in FIG. 13 can be performed by the radio terminal apparatus 300. That is, the radio terminal apparatus 300 performs the automatic selection process instead the process of displaying the radio service provider information shown in FIG. 9 (407) and the process of selecting the radio service provider (408). When the radio terminal apparatus 300 performs the automatic selection process, the radio terminal apparatus 300 transmits the USIM information delivery request for the selected radio service provider to the radio service provider searching server 200 (409 and 410), as in the example shown in FIG. 9. Thereafter, the process of transmitting the USIM information delivery request and the other processes are performed as in the example shown in FIG. 9 (411 to 415).

According to the second embodiment of the disclosure, the desired radio service provider can be automatically selected.

Thus, it is possible to more easily use the contract authentication information appropriate to the use region of the radio terminal apparatus.

In the embodiments of the disclosure, the example has been described in which the radio service provider searching server 200 performs the searching process and the selection process for the radio service provider. However, parts or the entirety of the recording contents of the radio service provider database 250 may be transmitted to another apparatus (for example, a searching apparatus of the radio service provider), this apparatus may perform the searching process and the selection process described above, the process of transmitting the USIM information may be performed based on the processing result.

Further, the radio service provider searching server 200 may transmits the part or entirety of the recording contents of the radio service provider database 250 to the radio terminal apparatus 300 and the radio terminal apparatus 300 may perform the searching process and the selection process described above. For example, the control unit 330 selects one radio service provider among the plurality of radio service providers associated with the received radio service provider information (the part or entirety of the recording contents of the radio service provider database 250) based on the radio service provider selection information set through the operation of the user. In this case, the control unit 330 transmits the USIM information delivery request to the radio service provider searching server 200 or the selected radio service provider or the like based on the selection process. The control unit 330 receives the USIM information regarding the selected radio service provider and controls writing the USIM information in the USIM information storage unit 350.

Further, the embodiments of the disclosure are applicable to portable radio terminal apparatuses (for example, terminal apparatus only for data communication) other than portable telephone apparatuses or fixed radio terminal apparatuses (for example, radio terminal apparatuses used to collect data from automated vending machines).

The embodiments of the disclosure are just the examples for realizing the disclosure. As described in the embodiments of the disclosure, the elements of the embodiments of the disclosure and the specific elements of an embodiment, another embodiment, still another embodiment of the disclosure have the correspondence relationship. Likewise, the specific elements of an embodiment, another embodiment, still another embodiment of the disclosure and the elements of the embodiments of the disclosure having the same names as those of these specific elements have the correspondence relationship. The disclosure is not limited to the embodiments, but may be modified in various forms within the scope of the disclosure without departing from the gist of the disclosure.

The processing sequence described in the embodiments of the disclosure may be understood as a method including the series of sequences or may be understood as a program causing a computer to execute the series of sequences or a recording medium storing the program. Examples of the recording medium include a CD (Compact Disc), an MD (Mini Disc), a DVD (Digital Versatile Disc), a memory card, and a Blu-ray disc (registered trademark).

The present disclosure contains subject matter related to that disclosed in Japanese Priority Patent Application JP 2010-251991 filed in the Japan Patent Office on Nov. 10, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A radio terminal apparatus comprising:
   circuitry configured to
      transmit an acquisition request for acquiring contract authentication information via a radio channel when a predetermined operation of acquiring the contract authentication information associated with a radio service provider providing a radio connection service is received,
      receive the contract authentication information transmitted via the radio channel in response to the acquisition request, and
      control writing the received contract authentication information in an electronic memory.

2. The radio terminal apparatus according to claim 1, wherein the circuitry transmits the acquisition request via the radio channel through a restricted connection process performed for only restricted connection without using the contract authentication information retained in the electronic memory.

3. The radio terminal apparatus according to claim 2, wherein the circuitry receives the contract authentication information via the radio channel connected through the restricted connection process in response to the acquisition request.

4. The radio terminal apparatus according to claim 1,
   wherein the acquisition request includes location information acquired by the radio terminal apparatus or location information corresponding to a location of a base station to which the radio terminal apparatus is connected,
   wherein the circuitry receives radio service provider information regarding a plurality of radio service providers selected based on the location information included in the acquisition request, and
   wherein the circuitry selects one radio service provider among the plurality of radio service providers associated with the received radio service provider information based on radio service provider selection information set through an operation of a user and writes the contract authentication information associated with the selected radio service provider in the electronic memory.

5. The radio terminal apparatus according to claim 1,
   wherein the acquisition request includes radio service provider selection information set through an operation of a user, and
   wherein the circuitry receives the contract authentication information associated with the selected radio service provider based on the radio service provider selection information included in the acquisition request.

6. The radio terminal apparatus according to claim 1,
   wherein the acquisition request includes location information acquired by the radio terminal apparatus or location information corresponding to a location of a base station to which the radio terminal apparatus is connected,
   wherein the circuitry receives radio service provider information regarding a plurality of radio service providers selected based on the location information included in the acquisition request,
   wherein the circuitry displays the received radio service provider information on a display, and
   wherein the circuitry transmits, as the acquisition request, an acquisition request for acquiring the contract authentication information associated with the selected radio service provider, when receiving a selection operation of selecting a desired radio service provider among the plurality of radio service providers associated with the radio service provider information displayed on the display.

7. The radio terminal apparatus according to claim 6, wherein the circuitry displays, as the radio service provider information, a list of labels of the plurality of radio service providers and displays at least one of a cost associated with the radio connection service provided by the radio service provider to be displayed, radio connection quality associated with the radio connection service, a congestion degree associated with the radio connection service, and congestion degree prediction associated with the radio connection service for each radio service provider.

8. The radio terminal apparatus according to claim 1,
wherein the circuitry transmits, as the acquisition request, an acquisition request for acquiring new contract authentication information other than the contract authentication information retained in the electronic memory, and
wherein the circuitry rewrites the contact authentication information retained in the electronic memory with the received contract authentication information.

9. A communication system comprising:
a radio terminal apparatus; and
an information processing apparatus,
wherein the radio terminal apparatus includes
a transmission control unit which transmits an acquisition request for acquiring contract authentication information via a radio channel when a predetermined operation of acquiring the contract authentication information associated with radio service providers providing a radio connection service is received,
a reception unit which receives the contract authentication information transmitted via the radio channel in response to the acquisition request, and
a control unit which controls writing the received contract authentication information in a retaining unit, and
wherein the information processing apparatus includes
a selection unit which specifies a location where the radio terminal apparatus exists when receiving the acquisition request, extracting the radio service providers providing the radio connection service at the location among the plurality of radio service providers, and selecting one radio service provider among the extracted radio service providers, and
a control unit which controls transmitting of the contract authentication information associated with the selected radio service provider to the radio terminal apparatus.

10. A method of controlling a radio terminal apparatus comprising:
transmitting an acquisition request for acquiring contract authentication information via a radio channel when a predetermined operation of acquiring the contract authentication information associated with a radio service provider providing a radio connection service is received;
receiving the contract authentication information transmitted via the radio channel in response to the acquisition request; and
controlling writing the received contract authentication information in an electronic memory.

* * * * *